US012214616B2

(12) United States Patent
Fukuda et al.

(10) Patent No.: US 12,214,616 B2
(45) Date of Patent: Feb. 4, 2025

(54) MECHANICAL PENCIL

(71) Applicant: MITSUBISHI PENCIL COMPANY, LIMITED, Tokyo (JP)

(72) Inventors: Takamasa Fukuda, Tokyo (JP); Yusuke Koizumi, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/578,444

(22) PCT Filed: Jul. 11, 2022

(86) PCT No.: PCT/JP2022/027265
§ 371 (c)(1),
(2) Date: Jan. 11, 2024

(87) PCT Pub. No.: WO2023/002879
PCT Pub. Date: Jan. 26, 2023

(65) Prior Publication Data

US 2024/0383270 A1 Nov. 21, 2024

(30) Foreign Application Priority Data

Jul. 20, 2021 (JP) ................................ 2021-119915

(51) Int. Cl.
*B43K 21/033* (2006.01)
*B43K 21/22* (2006.01)

(52) U.S. Cl.
CPC ............ *B43K 21/033* (2013.01); *B43K 21/22* (2013.01)

(58) Field of Classification Search
CPC ....... B43K 21/033; B43K 21/16; B43K 21/22
See application file for complete search history.

(56) References Cited

U.S. PATENT DOCUMENTS 3,850,531 A * 11/1974 Ackermann ........... B43K 21/02 401/55
8,337,107 B2 * 12/2012 Ohsawa ................. B43K 21/16 401/92

(Continued)

FOREIGN PATENT DOCUMENTS

JP 53-145734 A 12/1978
JP 2016-153246 A 8/2016

(Continued)

OTHER PUBLICATIONS

Machine Translation of JP-2020097210-A (Year: 2020).*
International Search Report issued Aug. 16, 2022 in PCT/JP2022/027265 filed on Jul. 11, 2022, 2 pages.

*Primary Examiner* — David P Angwin
*Assistant Examiner* — Bradley S Oliver
(74) *Attorney, Agent, or Firm* — Oblon, McClelland, Maier & Neustadt, L.L.P.

(57) ABSTRACT

A mechanical pencil includes a ball chuck, a rotation drive mechanism having a rotary part, a feedout cam face having a step part in the axial direction, an input member rotating upon receiving a rotational drive force of the rotary part, and an output member having an abutting part abutting against the feedout face and a slider provided with a holding chuck holding lead, the abutting part moves along the feedout face corresponding to rotation of the output member and so that advancing motion of the slider when the abutting part drops into the drop difference causes lead held by the holding chuck to be pulled out by the ball chuck, and further including a clutch mechanism transmitting rotational movement of the input member to the output member.

9 Claims, 20 Drawing Sheets

(56) References Cited

U.S. PATENT DOCUMENTS

| | | | | |
|---|---|---|---|---|
| 9,302,529 | B2 * | 4/2016 | Izawa | B43K 21/006 |
| 9,597,920 | B2 * | 3/2017 | Oomoto | B43K 21/16 |
| 2022/0184995 | A1 * | 6/2022 | Fukuda | B43K 21/033 |

FOREIGN PATENT DOCUMENTS

| | | | | |
|---|---|---|---|---|
| JP | 2020097210 | A * | 6/2020 | B43K 21/033 |
| WO | WO 2011/067912 | A1 | 6/2011 | |
| WO | WO 2012/014832 | A1 | 2/2012 | |
| WO | WO 2020/217682 | A1 | 10/2020 | |

* cited by examiner (D)

(E)

MECHANICAL PENCIL

FIELD

The present invention relates to a mechanical pencil.

BACKGROUND

In a mechanical pencil, for example, by clicking on a click part provided at a rear end part of a cylindrical barrel, a certain amount of lead is fed out from a tip member or slider attached to a front end side of the cylindrical barrel. The lead is worn down in the course of writing, and thus it is necessary to perform a click operation after a certain amount of writing.

Known in the art is a mechanical pencil able to automatically successively feed out lead utilizing writing pressure accompanying writing (see PTL 1). The mechanical pencil described in PTL 1 has a ball chuck for gripping lead, a rotation drive mechanism for receiving a retraction motion in the axial direction due to the writing pressure received by the lead gripped by the ball chuck and an advancing motion in the axial direction due to removal of the writing pressure and driving a rotary part to rotate in one direction, and a lead feedout mechanism including a cam member, holding chuck, etc. for receiving rotational drive force of the rotary part in the rotation drive mechanism and feeding out lead forward. The ball chuck is configured so as to allow advance of the lead and prevent retraction.

A ball chuck, as explained later, has a fastener formed in a cylindrical shape, a chuck body arranged inside the fastener and gripping the lead, and a plurality of balls. At the inside circumferential surface of the fastener, a tapered surface spreading out toward the front is formed. If writing pressure is applied to the lead, the chuck body retracts together with the balls and the balls abut against the tapered surface at the inside of the cylindrically shaped fastener. The balls move to the center along the tapered surface the further retracted. Due to the balls moving to the center, the chuck body also moves to the center. As a result, the lead is fastened and held by the chuck body. Due to this, retraction of the lead is obstructed. On the other hand, if force is acting pulling out the lead forward, the balls advance together with the chuck body. As a result, the fastening force by the tapered surface through the balls is released, i.e., the chuck body is not acted on by the fastener, so the lead can be pulled out forward without resistance. It should be noted that the chuck body is biased backward by a coil spring.

The lead feedout mechanism has a cam member provided with a cam face rising along the peripheral direction and a step part in the axial direction and a slider provided with an abutting part. The slider is biased forward by a spring whereby the abutting part abuts against the cam face. Further, the slider is linked with the rotation drive mechanism and rotates by receiving the rotation drive force of the rotation drive mechanism. At this time, the abutting part operates so as to rise up along the cam face of the cam member. Along with this, the slider gradually retracts in the axial direction.

Further, if the abutting part of the slider reaches the step part of the cam member, the abutting part drops down along the step part due to the action of the spring biasing the slider. At that instant, the slider also receives an advancing movement corresponding to the height difference of the step part. At this time, the holding chuck arranged inside the slider also similarly advances, so operates to pull out the lead sliding against and held by the holding chuck from the ball chuck whereby the lead is fed out. In other words, if the rotary part rotates one turn, the abutting part circles once along the cam face and feeds out the lead.

CITATIONS LIST

Patent Literature

[PTL 1] Japanese Unexamined Patent Publication No. 2016-153246

SUMMARY

Technical Problem

Here, preferably, due to the lead feedout mechanism, the same length of lead is fed out as the length decreased by wear of the lead (amount of wear), Due to this, a user can continue writing without any click operation. The amount of lead fed out depends on the height of the step part of the cam face. However, due to the structure of the ball chuck, the advancing distance of the lead by the step part of the cam face will not become amount of feedout of the lead as it is.

In other words, in the state after the lead is pulled out from the ball chuck due to a click operation or due to operation of the lead feedout mechanism and before writing pressure is applied to the lead, there is room for further retraction of the chuck body and balls and in turn the lead (below, referred to as "backlash"). Specifically, the backlash is 0.2 mm or so. For example, if making the number of times of writing motions ("number of strokes") required for the rotary part to rotate one turn 40 strokes, the amount of wear of the lead is generally 0.05 mm or so, while also depending on the writing pressure and magnitude of frictional resistance with the writing surface. If considering the backlash and making the height of the step part of the cam face 0.25 mm, the amount of wear due to writing and the amount of feedout by the lead feedout mechanism become the same and a user can continue writing without a click operation.

However, normally backlash includes error (tolerance) in a range of ±0.1 mm or so. Therefore, even if making the height of the step part of the cam face of the lead feedout mechanism 0.25 mm and the lead is fed out by 0.25 mm, if considering the error of backlash, there is a possibility that the lead will retract by 0.25 mm or more. In other words, the error in the amount of feedout of lead becomes 0.05 mm±0.1 mm and sometimes substantially the lead is not fed out. On the other hand, if increasing the height of the step part of the cam face, for example, making it 0.5 mm, considering the backlash, sometimes the lead will end up being dispensed too much.

For this reason, if possible to delay the timing of feedout of lead by the lead feedout mechanism to reduce the frequency and thereby feed out longer lead after the lead is worn out more, it is possible to substantially prevent lead from not being fed out due to error.

The present invention has as its object the provision of a mechanical pencil provided with a lead feedout mechanism able to more reliably feed out lead.

Solution to Problem

According to one aspect of the present invention, there is provided a mechanical pencil lead comprising a ball chuck allowing advance of lead and preventing retraction, a rotation drive mechanism having a rotary part and receiving a retracting motion in the axial direction due to writing pressure received by the lead gripped by the ball chuck and an advancing motion in the axial direction due to release of writing pressure so as to make the rotary part be driven to rotate in one direction, a feedout face having a ring-shaped cam face and a drop difference in the axial direction provided at the ring-shaped cam face, an input member rotating upon receiving a rotational drive force of the rotary part, and an output member having an abutting part abutting against the feedout face and a slider provided with a holding chuck holding lead, configured so that the abutting part moves along the feedout face corresponding to rotation of the output member and so that advancing motion of the slider when the abutting part drops into the drop difference causes lead held by the holding chuck to be pulled out by the ball chuck, and further comprising a clutch mechanism transmitting rotational movement of the input member to the output member so that when the input member rotates by exactly a first rotational angle, the output member rotates by exactly a second rotational angle smaller than the first rotational angle.

The clutch mechanism may be a claw clutch or friction clutch. The clutch mechanism may be a claw clutch, the input member may be formed with an input cam face and the output member may be formed with an output cam face facing the input cam face, the input cam face and output can face may engage at only part of rotational movement of the rotary part, and rotational movement of the rotary part may be transmitted through the input member to the output member. The rotation drive mechanism may have a first cam-forming member and second cam-forming member, the rotary part may be formed in a circular ring shape, one end face and the other end face in the axial direction may be respectively formed with a first cam face and a second cam face, and the first cam face and the second cam face may have a first fixed cam face and a second fixed cam face formed at the first cam-forming member and the second cam-forming member respectively facing them arranged at them, the mechanical pencil may be configured so that retracting motion of the ball chuck due to the writing pressure causes the first cam face of the rotary part to abut against and mesh with the first fixed cam face and so that release of the writing pressure causes the second cam face of the rotary part to abut against and mesh with the second fixed cam face, in the state where the first cam face of the rotary part has meshed with the first fixed cam face, the second cam face and the second fixed cam face of the rotary part may be set to a relationship shifted in phase with respect to one tooth of the cam in the axial direction and, in the state where the second cam face of the rotary part has meshed with the second fixed cam face, the first cam face of the rotary part and the first fixed cam face may be set to a relationship shifted in phase with respect to one tooth of the cam in the axial direction, and a pitch of cam in the clutch mechanism may be set smaller than a pitch of cam in the rotation drive mechanism. The mechanical pencil may be configured so that the lead rotates by the ball chuck rotating by receiving rotational drive force of the rotary part, Between the output member and the cylindrical barrel, a viscous fluid inhibiting movement of the output member in the axial direction may be arranged. The mechanical pencil may be configured so that the height of the drop difference is adjusted so that that amount of feedout of lead is adjusted. The mechanical pencil may be configured further comprising a ring shaped or cylindrical shaped first cam member and a ring shaped or cylindrical shaped second cam member arranged outside the first cam member in the diametrical direction, the feedout face configured by the first cam member and the second cam member cooperating. A height of the drop difference may be adjusted by making the first cam member and the second cam member rotate relatively about a center axis.

Advantageous Effects of Invention

According to the above aspects of the present invention, a common effect is exhibited that a mechanical pencil provided with a lead feedout mechanism able to more reliably feed out lead is provided.

DESCRIPTION OF EMBODIMENTS

Figure 1:
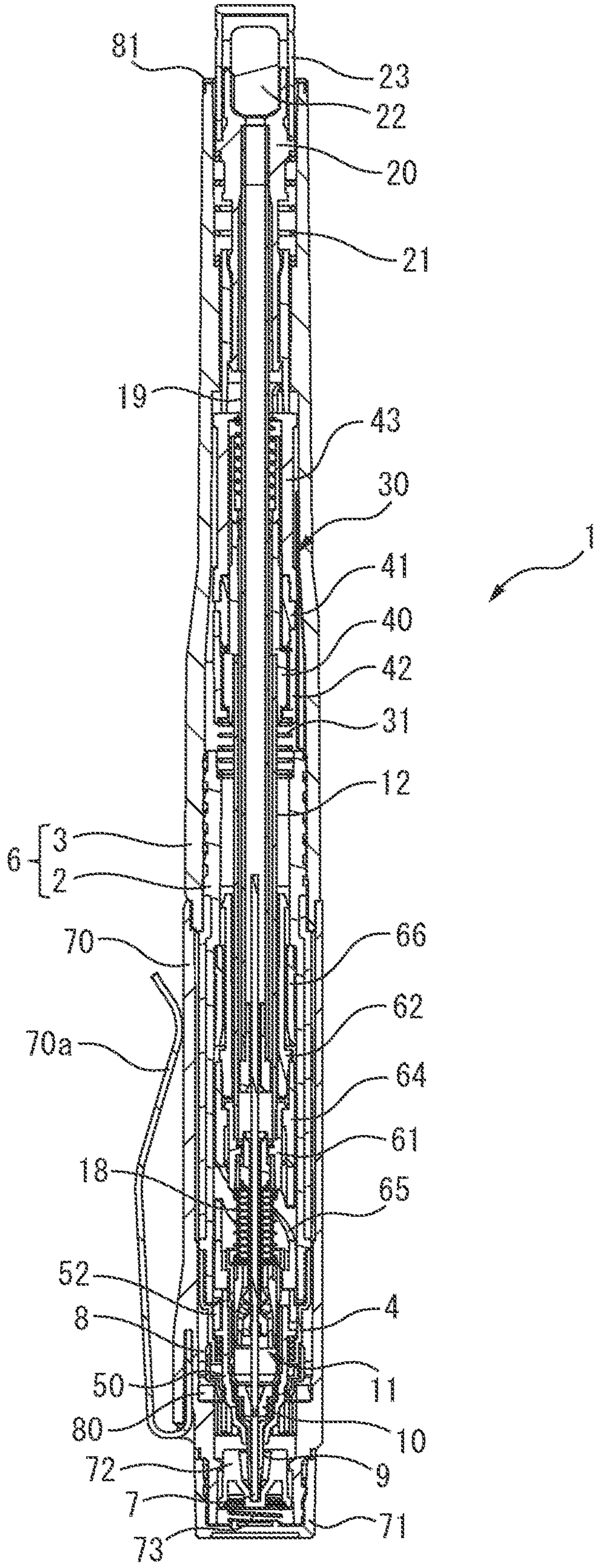
FIG. 1 is a vertical cross-sectional view of a mechanical pencil according to an embodiment of the present invention.

Below, embodiments of the present invention will be explained in detail while referring to the drawings. Throughout the figures, corresponding component elements will be assigned common reference notations.

Figure 2:
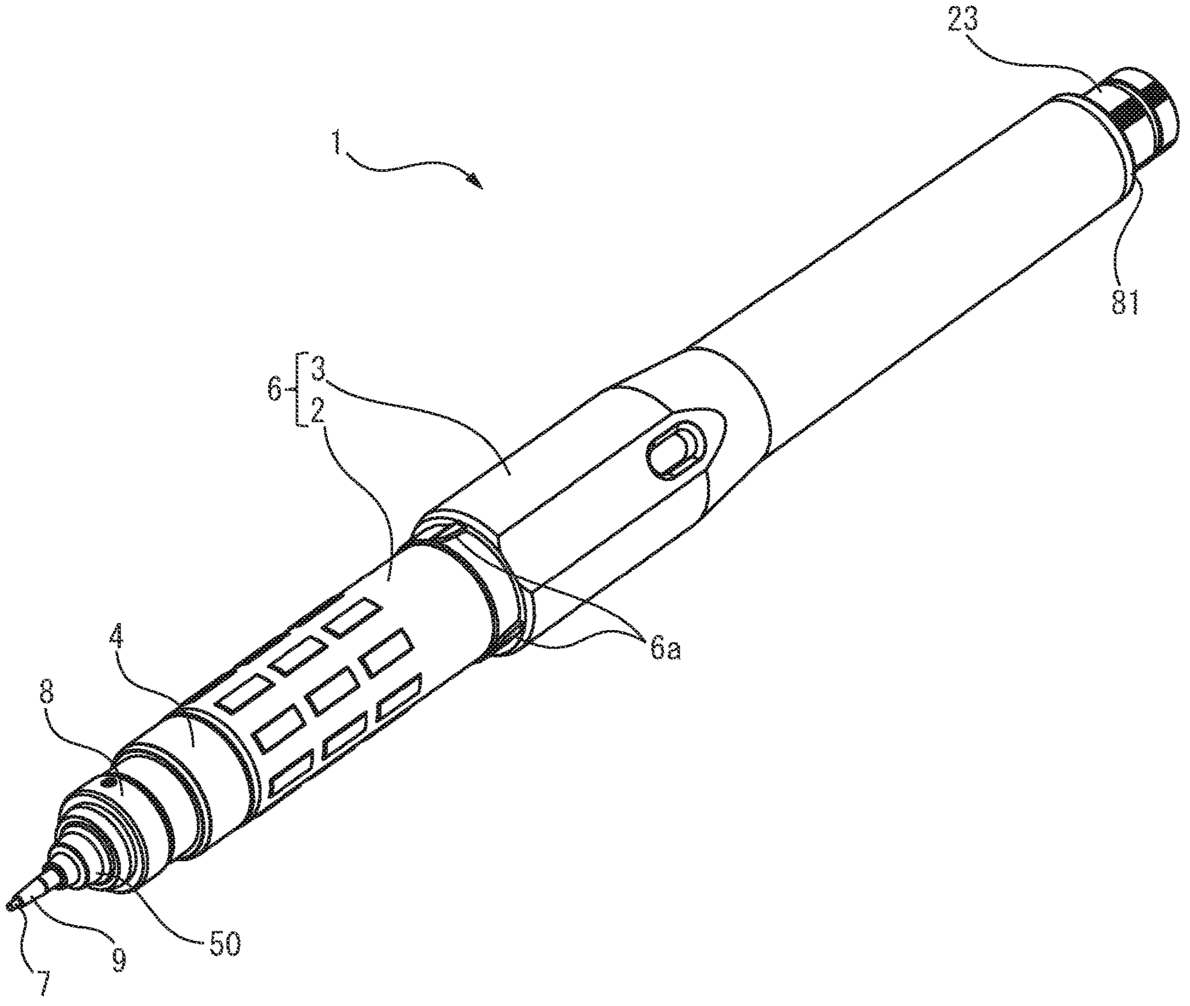
FIG. 2 is a perspective view of the mechanical pencil.
Figure 3:
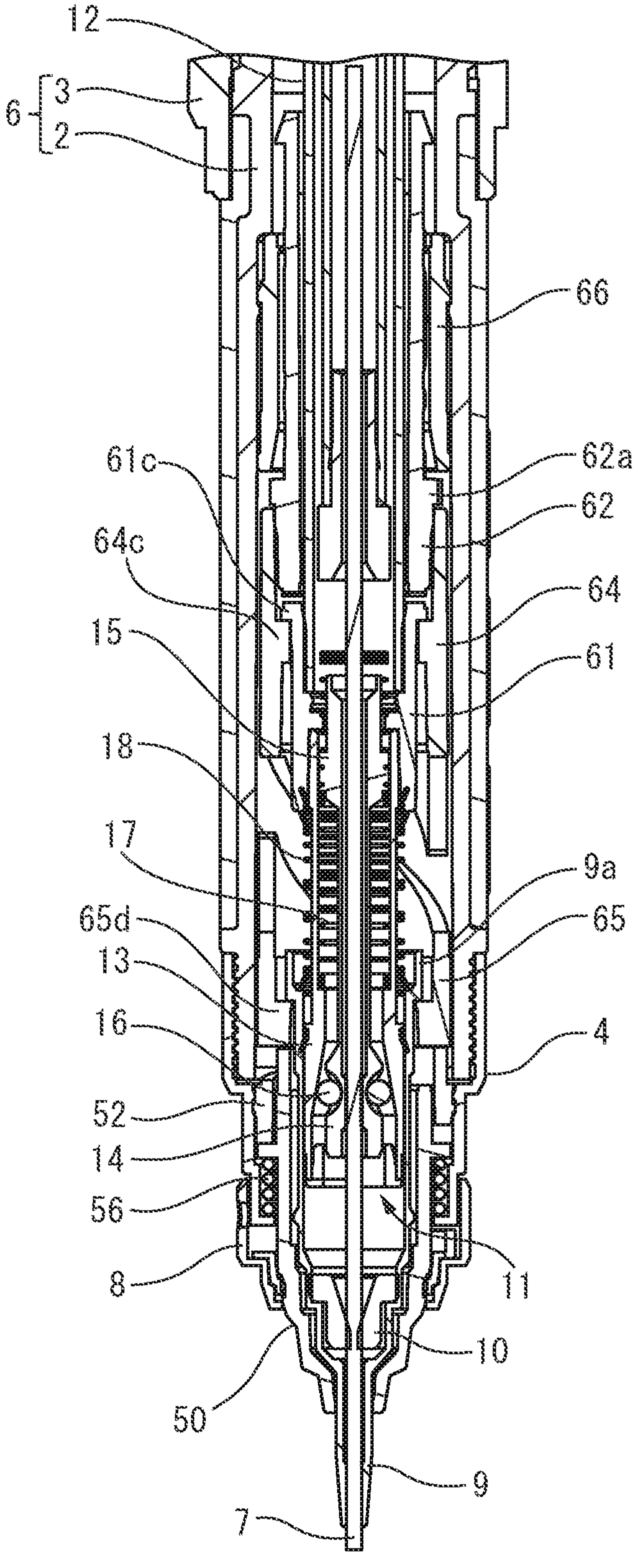
FIG. 3 is an enlarged cross-sectional view of a front half of the mechanical pencil.
Figure 4:
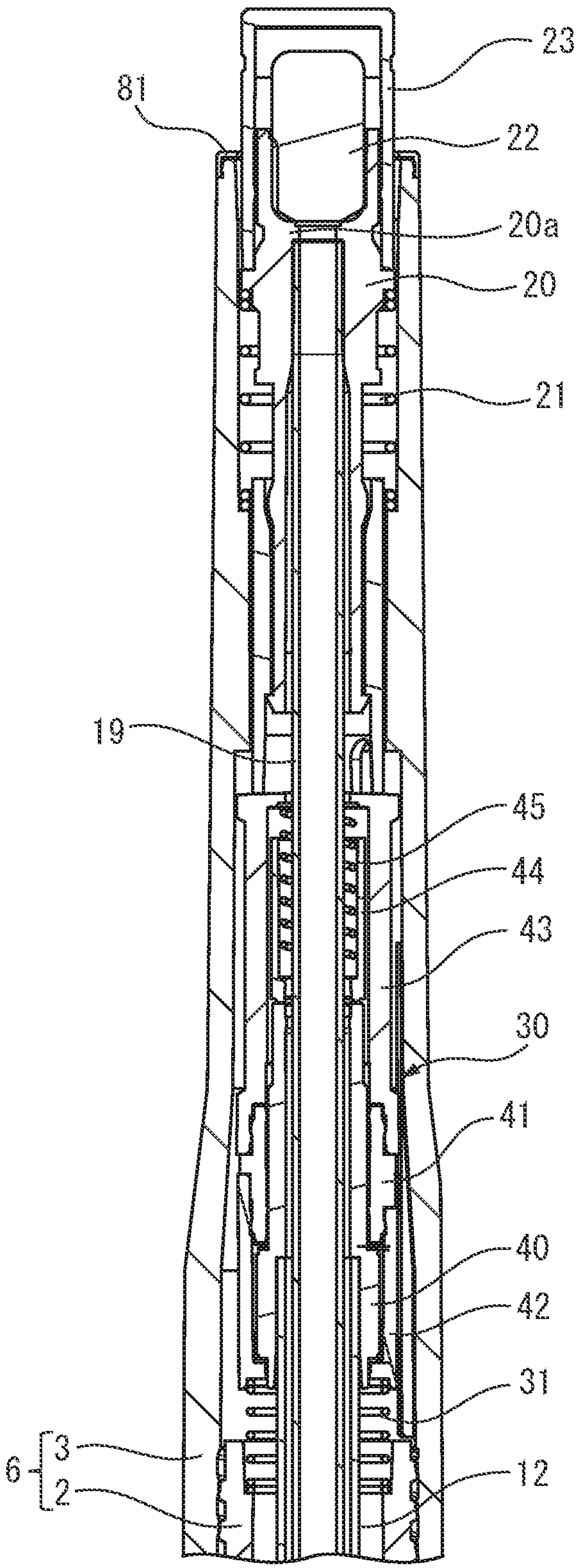
FIG. 4 is an enlarged cross-sectional view of a rear half of the mechanical pencil.
Figure 5:
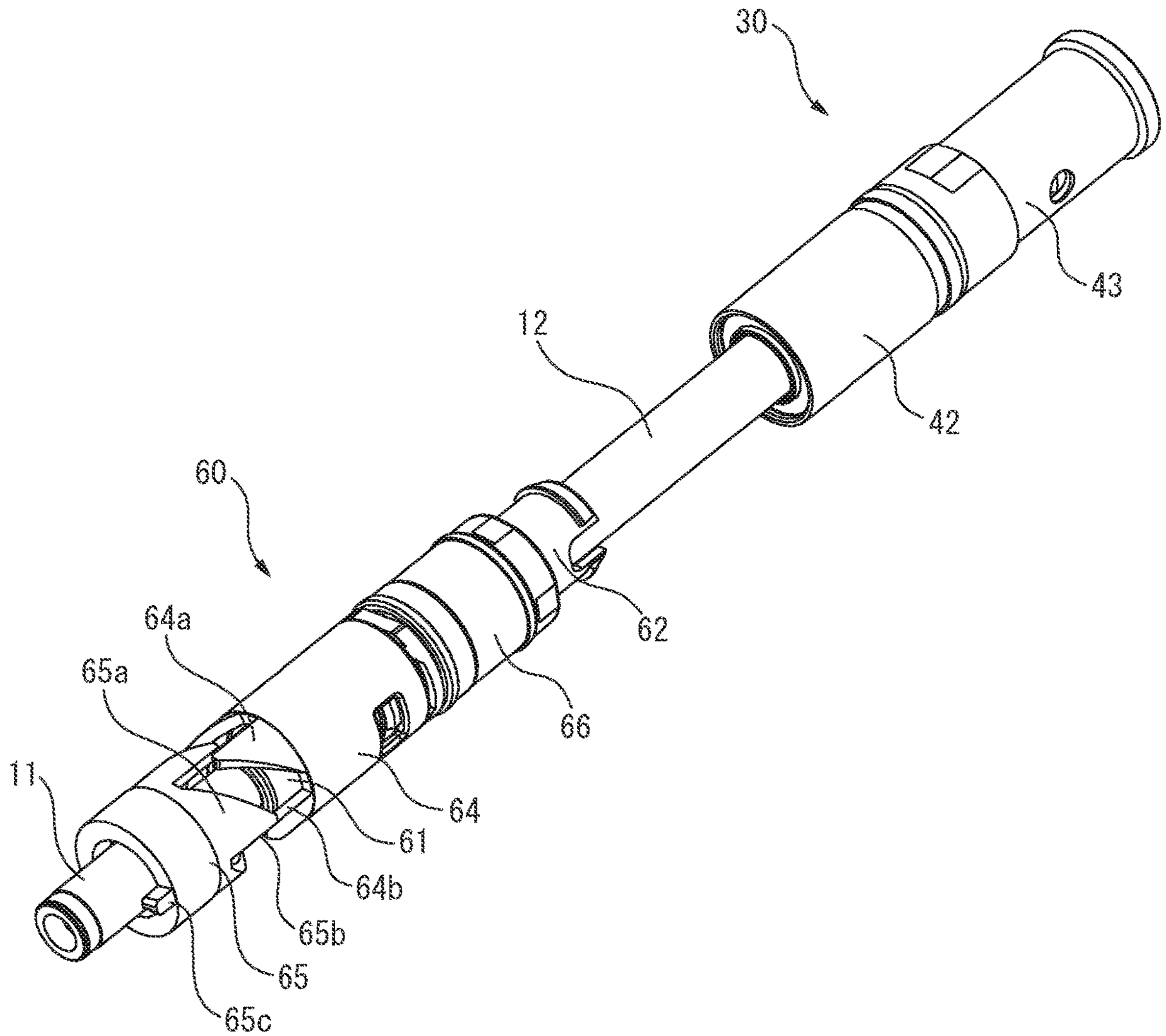
FIG. 5 is a perspective view explaining an internal structure of the mechanical pencil.
Figure 6:
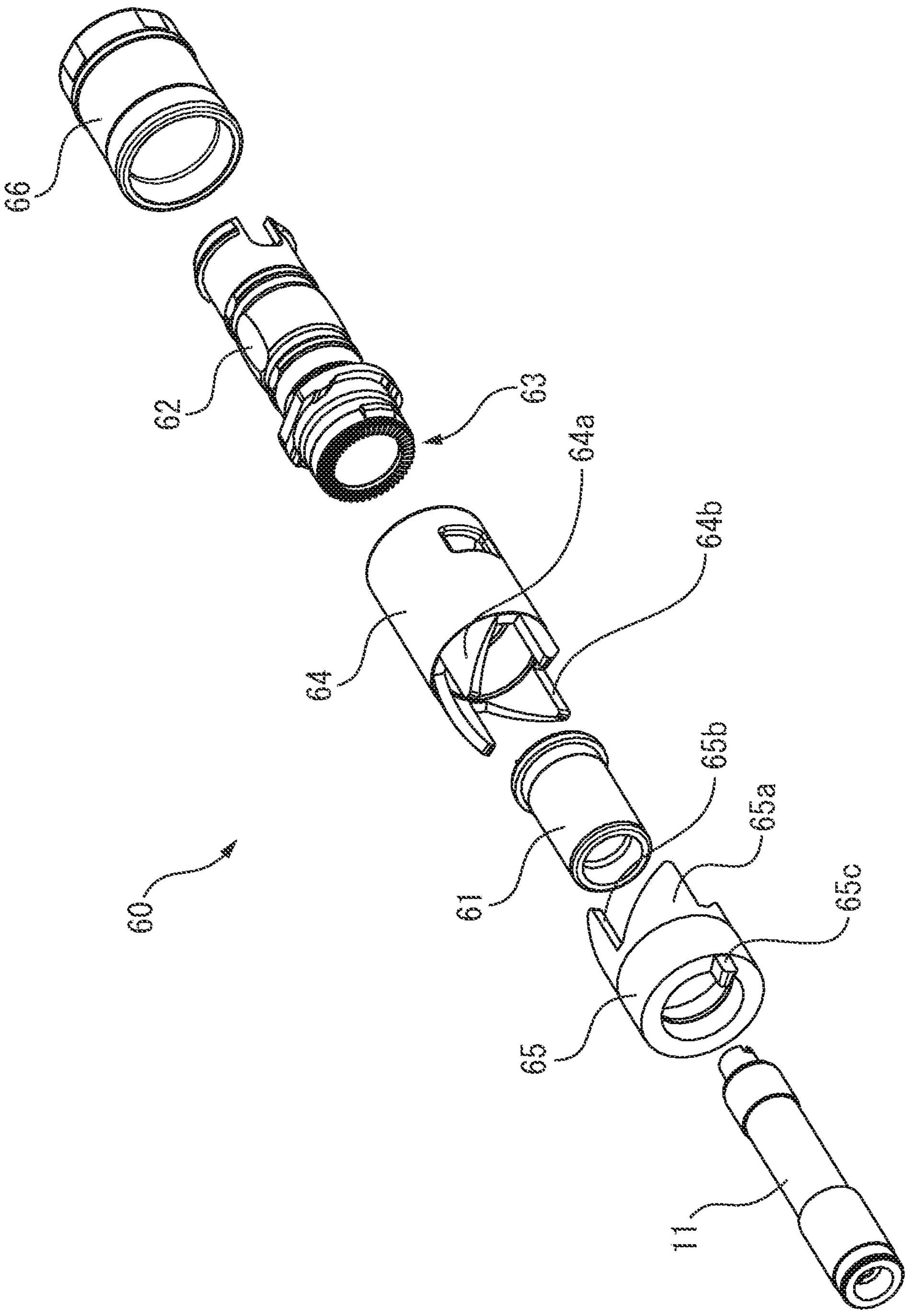
FIG. 6 is a disassembled perspective view of a clutch mechanism.

FIG. 1 is a vertical cross-sectional view of a mechanical pencil 1 according to an embodiment of the present invention, FIG. 2 is a perspective view of the mechanical pencil 1, FIG. 3 is an enlarged cross-sectional view of a front half of the mechanical pencil 1, FIG. 4 is an enlarged cross-sectional view of a rear half of the mechanical pencil 1. FIG. 5 is a perspective view explaining an internal structure of the mechanical pencil 1, and FIG. 6 is a disassembled perspective view of a clutch mechanism 60.

The mechanical pencil 1 has a front shaft 2, a rear shaft 3 screwed over an outer circumferential surface of a rear end part of the front shaft 2, and a tip member 4 screwed over an outer circumferential surface of a front end part of the front shaft 2. The front shaft 2 and rear shaft 3 configure a cylindrical barrel 6. It should be noted that these may also be referred to as the cylindrical barrel 6 including also the tip member 4. As explained later, the mechanical pencil 1 is configured so that the lead 7 projects out from the front end part of the slider 9. In this Description, the lead 7 side in the axial direction of the mechanical pencil 1 is defined as the “front” side and the side opposite to the lead 7 side is defined as the “rear” side.

Referring to FIG. 3, inside of the front end part of the cylindrical barrel 6, a slider 9 is arranged to be able to slide in the axial direction and to be able to rotate about its axis. The slider 9 is formed in a cylindrical shape with the outside diameter becoming smaller in stages toward the front. At the outer circumferential surface of the rear end part of the slider 9, a flange part **9*a* is provided. The lead 7 is guided by the slider 9 and becomes able to project out from the front end part of the slider 9. At the inside of the slider 9, a holding chuck 10 formed with a through hole 10*a* at its center is arranged. The through hole 10*a* of the holding chuck 10 slides over the outer circumferential surface of the lead 7 and acts to temporarily hold the lead 7**.

At the outer circumferential surface of the slider 9, a dial cam member 50 is arranged as the first cam member formed in a cylindrical shape and a rail can member 52 is arranged as the second cam member formed in a ring shape in a state aligned in the axial direction. At the front end part of the tip member 4 and the outer circumferential surface of the dial can member 50, a substantially cylinder shaped holding part 8 is provided. The front end part of the slider 9 projects out from the hole at the front end part of the dial cam member 50. At the inner circumferential surface of the rear end part of the slider 9, a ball chuck 11 holding the lead 7, specifically, a fastener 13, is fit.

The ball chuck 11 has a fastener 13 formed in a cylindrical shape, a chuck body 14 arranged inside the fastener 13, a chuck holding part 15 formed in a cylindrical shape, and a plurality of balls 16. At the inner circumferential surface of the fastener 13, a tapered surface spreading out toward the front is formed. The chuck body 14 is formed with a through hole of the lead 7 along its center axis. The front end part of the chuck body 14 is divided to several sections along the axial direction. The rear end part of the chuck body 14 is held by the chuck holding part 15. The chuck body 14 and the chuck holding part 15 can move in the axial direction with respect to the fastener 13. The plurality of balls 16 are arranged between the inner circumferential surface of the fastener 13 and the outer circumferential surface of the chuck body 14.

If writing pressure is applied to the lead 7, the chuck body 14 abuts against the tapered surface inside the cylindrical fastener 13 together with the balls 16, so the lead 7 is held by the chuck body 14. Due to this, retraction of the lead 7 is prevented. On the other hand, if force acts to pull out the lead 7 to the front, the chuck body 14 is not acted on by the fastener 13, so it is possible to pull out the lead 7 to the front without resistance. In other words, the ball chuck 11 acts to allow advance and prevent retraction of the lead 7.

A coil spring 17 is arranged so as to surround the chuck body 14. The rear end part of the coil spring 17 fits with an outer surface of the chuck body 14. The front end part of the coil spring 17 is supported by a step part formed at an inner circumferential surface of the fastener 13. The coil spring 17 biases the chuck body 14 to the rear. As a result, the ball chuck 11 can maintain the state holding the lead 7. A cam abutting spring 18 is arranged as the coil spring so as to surround the fastener 13. The cam abutting spring 18 biases the slider 9 to the front. At the outer circumferential surface of the rear end part of the chuck holding part 15, the front end part of a lead case 19 is fit. The lead case 19 is formed in a cylindrical shape. Inside, the lead 7 is received.

At the ball chuck 11, an input clutch cam 61 of the later explained clutch mechanism 60 is connected. In other words, the input clutch cam 61 is formed in a cylindrical shape. At the inner circumferential surface of the front end part of the input clutch cam 61, the outer circumferential surface of the rear end part the fastener 13 of the ball chuck 11 is fit. At the inner circumferential surface of the rear end part of the input clutch cam 61, the outer circumferential surface of the front end part of the relay member 12 formed in a tubular shape is fit. The clutch mechanism 60, as explained later while referring to FIG. 5 and FIG. 6, has a projection shaped abutting part **65*c* projecting out to the front. The abutting part 65*c* is biased to the front by the cam abutting spring 18 through the slider 9. Therefore, the slider 9, ball chuck 11, relay member 12, input clutch cam 61, and abutting part 65*c* can integrally move inside the cylindrical barrel 6 in the axial direction. The rear end part of the relay member 12 is linked with the later explained rotation drive mechanism 30**.

Referring to FIG. 4, at the rear end part of the cylindrical barrel 6, the click rod 20 is provided as a click part to be able to move back and forth with respect to the cylindrical barrel 6. A click rod 20 is biased to the back by a coil spring 21. Near the rear end part of the click rod 20, a partition part **20*a* provided with a refilling hole of the lead 7 is formed. Inside of the rear end part of the click rod 20, an eraser 22 can be attached in a detachable manner. At the outer circumferential surface of the rear end part of the click rod 20, a click cover 23 is attached in a detachable manner and protects the eraser 22 from becoming dirty etc. The click rod 20 fits with the outer circumferential surface of the rear end part of the lead case 19**.

The lead case 19 advances by performing a click operation pressing the click rod 20 or click cover 23 to the front. Due to this, the chuck body 14 is pressed to the front through the chuck holding part 15. This acts so that, along with this, the lead 7 gripped by the chuck body 14 also advances and the lead 7 is made be fed out from the slider 9.

If releasing the pressing operation due to the click operation, due to the biasing force of the coil spring 21, the click rod 20 retracts and returns to its original position. At this time, the chuck body 14 retracts due to the biasing force of the coil spring 17. On the other hand, the lead 7 is held by the holding chuck 10 arranged at the inside of the slider 9, so, as an action of the ball chuck 11, the lead 7 is pulled out from the chuck body 14 without resistance. As a result, the lead 7 is fed out from the slider 9, so the lead 7 can be fed out a predetermined amount at a time with each repetition of a click operation. If maintaining a state where the click rod 20 is made to advance by a click operation, the state becomes one where the chuck body 14 projects out from the fastener 13 and the grip on the lead 7 is released. In this state, it is possible to press back the lead 7 in the state fed out from the slider 9 by a fingertip etc.

Figure 7:
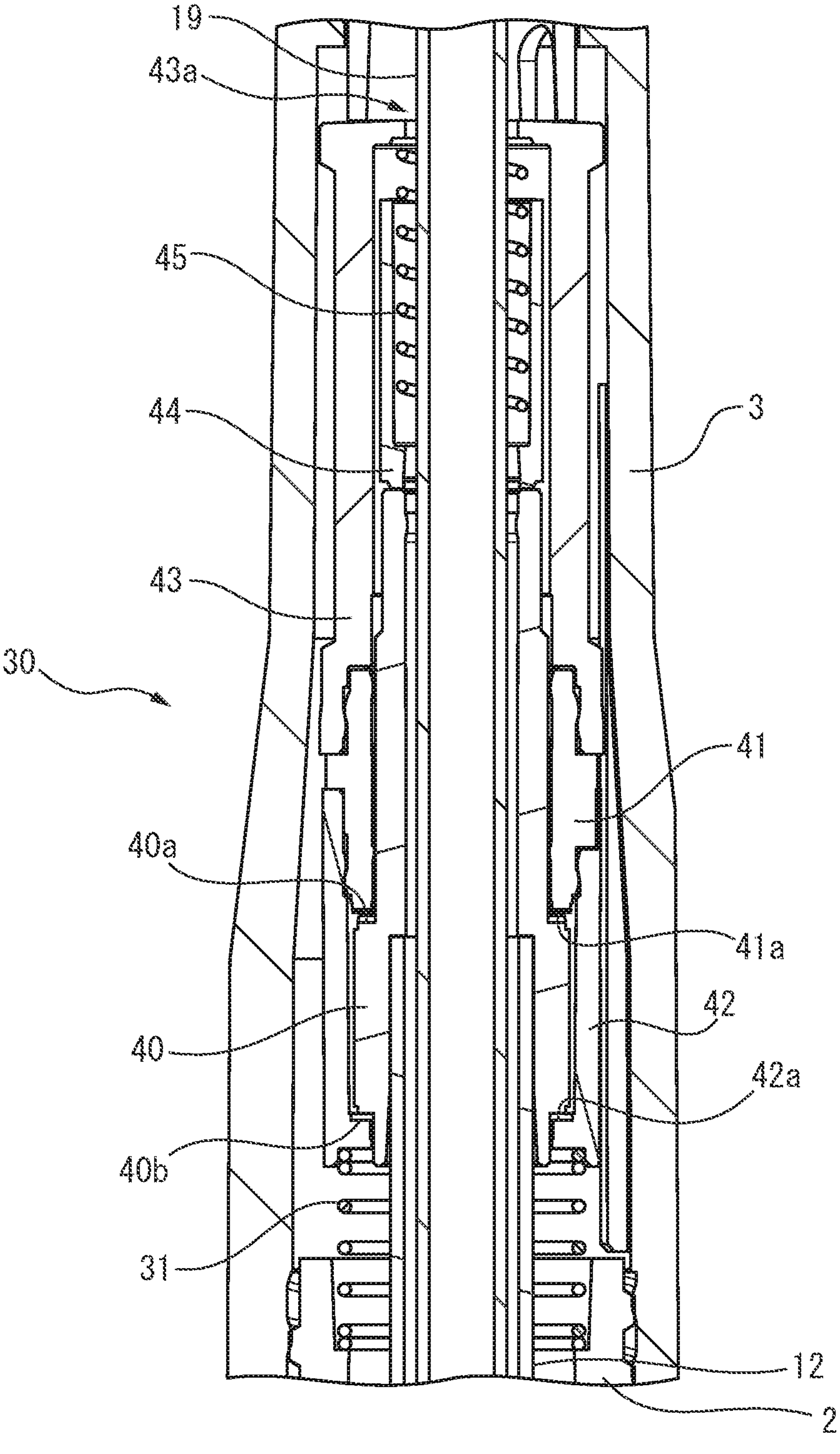
FIG. 7 is an enlarged cross-sectional view of a rotation drive mechanism.

FIG. 7 is an enlarged cross-sectional view of a rotation drive mechanism 30. The rotation drive mechanism 30 is arranged in an inside space of the rear shaft 3. The rotation drive mechanism 30 is connected to the rear end part of the relay member 12. Between the rear end face of the front shaft 2 and the front end face of the rotation drive mechanism 30, an axis spring 31 is arranged and thereby the rotation drive mechanism 30 is biased to the rear. The movement of the rotation drive mechanism 30 to the rear due to the biasing force of the axis spring 31 is restricted by the rear end face of the rotation drive mechanism 30 abutting against a step difference provided at the inside surface of the cylindrical barrel 6. The lead case 19 passes through the inside of the relay member 12 and rotation drive mechanism 30 and is separated from the rotation drive mechanism 30.

The rotation drive mechanism 30 has a rotary part 40 formed in a cylindrical shape, an upper cam-forming member 41 as a first cam-forming member formed in a cylindrical shape, a lower cam-forming member 42 as a second cam-forming member formed in a cylindrical shape, a cylinder member 43 formed in a cylindrical shape, a torque canceller 44 formed in a cylindrical shape, and a coil shape cushion spring 45. The rotation drive mechanism 30 is formed into a unit by these members combined.

At the inner circumferential surface of the front end part of the rotary part 40, the outer circumferential surface of the rear end part of the relay member 12 is fit. The vicinity of the front end part of the rotary part 40 has a part formed in a flange shape with a just slightly larger diameter. At the rear end face of that part, a first cam face 40*a* is formed. At the front end face of that part, a second cam face 40*b* is formed.

The upper cam-forming member 41 surrounds the rotary part 40 at the rear of the first can face 40*a* of the rotary part 40 to be able to turn. The lower cam-forming member 42 fits with the outer circumferential surface of the front end part of the upper cam-forming member 41. At the front end face of the upper cam-forming member 41 facing the first cam face 40*a* of the rotary part 40, a first fixed cam face 41*a* is formed as a first fixed cam face. At the inside surface of the front end part of the lower cam-forming member 42 facing the second cam face 40*b* of the rotary part 40, a second fixed cam face 42*a* is formed as a second fixed cam face.

At the outer circumferential surface of the rear end part of the upper cam-forming member 41, a cylinder member 43 formed in a cylindrical shape is fit. At a rear end part of the cylinder member 43, an insertion hole 43*a* through which the lead case 19 can pass is formed. Inside of the cylinder member 43, a torque canceller 44 formed in a cylindrical shape and able to move in the axial direction is arranged. Between the inside surface of the front end part of the torque canceller 44 and the inside surface of the rear end part of the cylinder member 43, a cushion spring 45 is arranged. The cushion spring 45 biases the rotary part 40 to the front through the torque canceller 44.

Here, the relay member 12 transmits advancing and retracting motions (cushion motions) of the lead 7 based on the writing motions to the rotation drive mechanism 30, i.e., the rotary part 40, and transmits the rotational movement of the rotary part 40 at the rotation drive mechanism 30 generated due to the cushion motions to the ball chuck 11 in the state gripping the lead 7. Therefore, the lead 7 held by the ball chuck 11 also rotates.

Except when writing by the mechanical pencil 1, i.e., when writing pressure is not applied to the lead 7, the rotary part 40 is positioned at the front by the biasing force of the cushion spring 45 through the torque canceller 44, Therefore, the second cam face 40*b* of the rotary part 40 is rendered a state abutting against and meshing with the second fixed cam face 42*a*. Wien writing by the mechanical pencil 1, i.e., when writing pressure is applied to the lead 7, the ball chuck 11 retracts against the biasing force of the cushion spring 45. Along with this, the rotary part 40 also retracts. Therefore, the first cam face 40*a* of the rotary part 40 is rendered a state abutting against and meshing with the first fixed cam face 41*a*.

Figure 8:
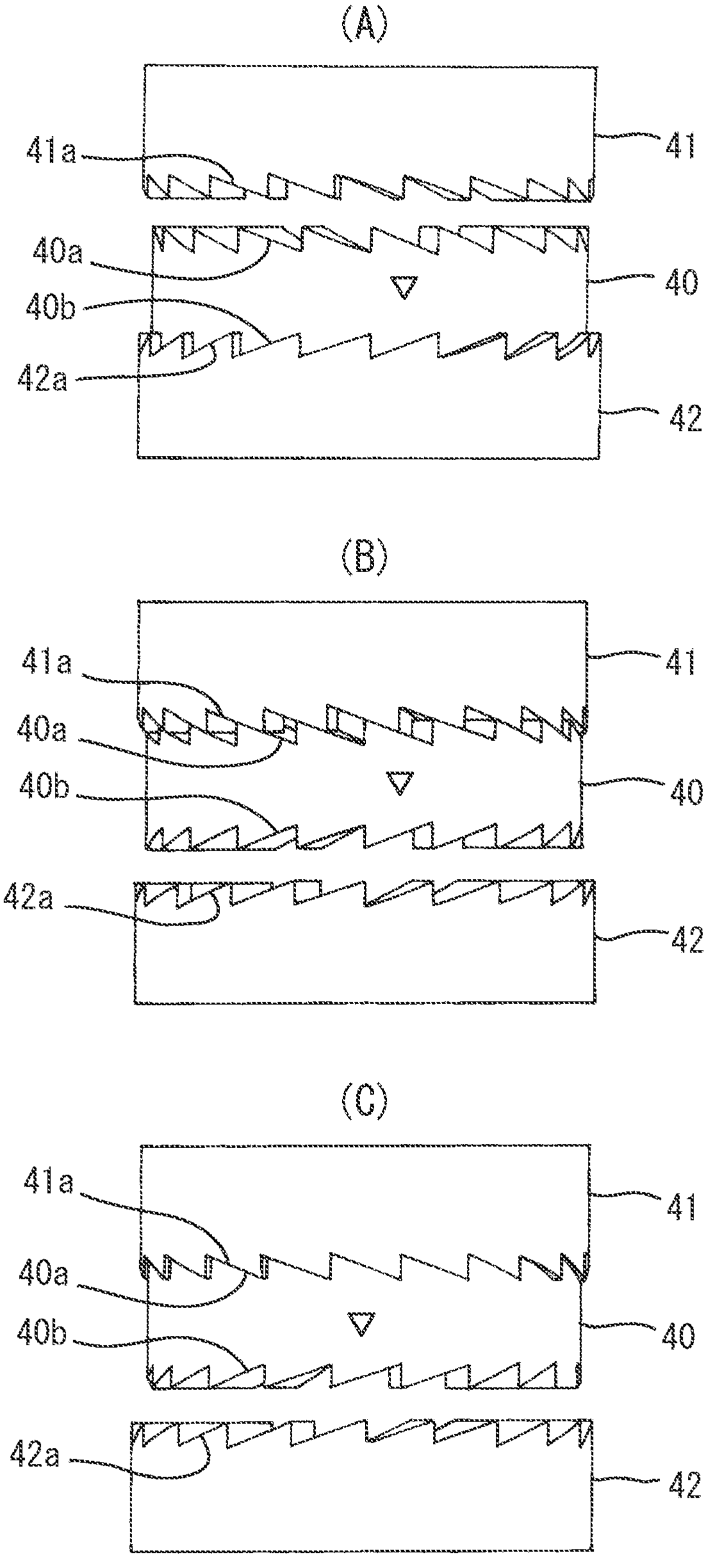
FIG. 8 is a schematic view explaining rotational drive of a rotary part of the rotation drive mechanism.
Figure 9:
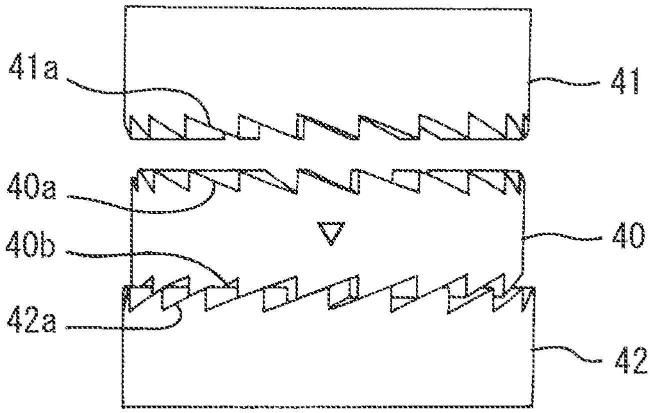
FIG. 9 is a schematic view explaining rotational drive of a rotary part of the rotation drive mechanism following FIG. 8.
Figure 9:
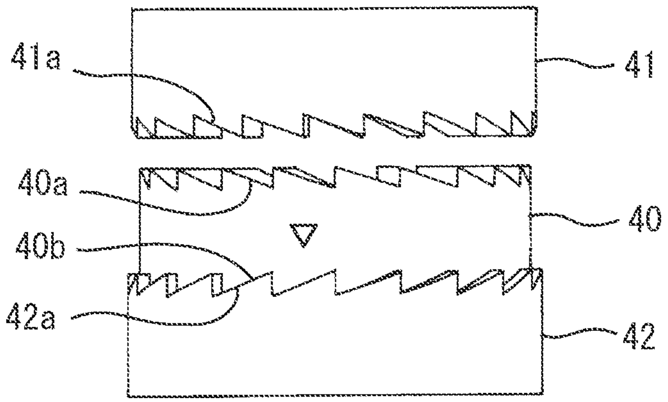

FIG. 8 is a schematic view explaining in order use for the rotational drive motion of the rotary part 40 of the mechanical pencil 1, while FIG. 9 is a schematic view explaining use for the rotational drive motion of the rotary part 40 following FIG. 8. In FIG. 8 and FIG. 9, at the rear end face constituted by the upper side face of the rotary part 40, the first cam face 40*a* made a continuous sawtooth shape along the circumferential direction is formed in a circular ring shape. At the front end face constituted by the lower side face of the rotary part 40, similarly the second cam face 40*b* made a continuous sawtooth shape along the circumferential direction is formed in a circular ring shape.

At the circular ring shape end face of the upper cam-forming member 41 facing the first cam face 40*a* of the rotary part 40 as well, the first fixed cam face 41*a* made a continuous sawtooth shape along the circumferential direction is formed. At the circular ring shape end face of the lower cam-forming member 42 facing the second cam face 40*b* of the rotary part 40 as well, the second fixed cam face 42*a* made a continuous sawtooth shape along the circumferential direction is formed. The cam faces of the first cam face 40*a* and second cam face 40*b* formed at the rotary part 40 and the cam faces of the first fixed cam face 41*a* formed at the upper cam-forming member 41 and the second fixed cam face 42*a* formed at the lower cam-forming member 42 are formed so as to become substantially the same pitch as each other.

(A) of FIG. 8 shows the relationship among the rotary part 40, the upper cam-forming member 41, and the lower cam-forming member 42 in the state where writing pressure is not applied to the lead 7. In this state, the second cam face 40*b* formed at the rotary pail 40 meshes with the second fixed cam face 42*a* of the lower cam-forming member 42 due to the biasing force of the cushion spring 45. At this time, the first cam face 40*a* of the rotary part 40 and the first fixed cam face 41*a* of the tipper cam-forming member 41 are set so as to become a relationship offset in the axial direction by half of a phase (half pitch) with respect to one tooth of the cam.

(B) of FIG. 8 shows the initial state where writing pressure is applied to the lead 7 for writing by the mechanical pencil 1. In this state, the rotary part 40 retracts while compressing the cushion spring 45 along with retraction of the ball chuck 11. Along with this, the rotary part 40 moves to the first fixed cam face 41*a* side of the upper cam-forming member 41.

Next, (C) of FIG. 8 shows the state where writing pressure is further applied to the lead 7 and the rotary part 40 abuts against the first fixed cam face 41*a* of the upper cam-forming member 41 and retracts. In this state, the first cam face 40*a* of the rotary part 40 meshes with the first fixed cam face 41*a* of the upper cam-forming member 41. Due to this, the rotary part 40 receives a rotational drive force corresponding to half of the phase (half pitch) of one tooth of the first cam face 40*a*.

It should be noted that the triangular marks attached to the center parts of the rotary parts 40 in FIG. 8 and FIG. 9 are used to show the amount of rotational movement of the rotary part 40. Further, in the state shown in (C) of FIG. 8, the second cam face 40*b* of the rotary part 40 and the second fixed cam face 42*a* of the lower cam-forming member 42 are set to become a relationship offset in the axial direction by half of the phase (half pitch) with respect to one tooth of the cam.

Next, (D) of FIG. 9 shows the initial state where writing by the mechanical pencil 1 ends and the writing pressure on the lead 7 is released. In this case, the rotary part 40 advances due to the biasing force of the cushion spring 45. Due to this, the rotary part 40 moves to the lower cam-forming member 42 side.

Next, (E) of FIG. 9 shows the state where the rotary part 40 abuts against the second fixed cam face 42*a* of the lower cam-forming member 42 and advances due to the biasing force of the cushion spring 45. In this case, the second cam face 40*b* of the rotary part 40 meshes with the second fixed cam face 42*a* of the lower cam-forming member 42. Due to this, the rotary part 40 again receives a rotational drive force corresponding to half of the phase (half pitch) of one tooth of the second cam face 40*b*.

Therefore, as shown by the triangular marks attached at the center part of the rotary part 40, along with backward and forward movement of the rotary part 40 receiving the writing pressure in the axial direction, i.e., back and forth movement, the rotary part 40 receives a rotational drive force corresponding to one tooth (one pitch) of the first cam face 40*a* and second cam face 40*b* and the lead 7 gripped by the ball chuck 11 is similarly driven to rotate through the ball chuck 11. Therefore, due to one back and forth movement of the rotary part 40 in the axial direction due to writing, the rotary part 40 receives rotational movement corresponding to one tooth of the cam. By repeating this, the lead 7 is successively driven to rotate. For this reason, it is possible to prevent the lead 7 from being unevenly worn along with further writing and possible to prevent the thickness of the drawn lines and the darkness of the drawn lines from greatly changing.

In summary, the rotation drive mechanism has a first cam-forming member and second cam-forming member, the rotary part is formed in a circular ring shape, one end face and the other end face in the axial direction are respectively formed with a first cam face and a second cam face, and the first cam face and the second cam face have a first fixed cam face and a second fixed cam face formed at the first cam-forming member and the second cam-forming member respectively facing the first cam face and the second cam face at them, the mechanical pencil configured so that retracting motion of the ball chuck due to the writing pressure causes the first cam face of the rotary part to abut against and mesh with the first fixed cam face and so that release of the writing pressure, causes the second cam face of the rotary part to abut against and mesh with the second fixed cam face, in the state where the first cam face of the rotary part has meshed with the first fixed cam face, the second cam face and the second fixed cam face of the rotary part are set to a relationship shifted in phase with respect to one tooth of the cam in the axial direction and, in the state where the second cam face of the rotary part has meshed with the second fixed cam face, the first cam face of the rotary part and the first fixed cam face are set to a relationship shifted in phase with respect to one tooth of the cam in the axial direction.

It should be noted that the torque canceller 44 receiving the biasing force of the cushion spring 45 and pushing out the rotary part 40 to the front generates sliding motion between the front end face of the torque canceller 44 and the rear end face of the rotary part 40 and preventing rotational movement of the rotary part 40 from being transmitted to the cushion spring 45. In other words, due to the torque canceller 44, rotational movement of the rotary part 40 is prevented from being transmitted to the cushion spring 45 and thereby torque of the cushion spring 45 obstructing rotational motion of the rotary part 40 is prevented from being generated.

Due to the above, the mechanical pencil 1 has a ball chuck 11 and a rotary part 40, is configured so that back and forth movement of the ball chuck 11 causes the lead 7 to be released and gripped whereby the lead 7 can be fed out to the front, and is configured so that the ball chuck 11 is held inside the cylindrical barrel 6 so that it can rotate about its center axis in the state holding the lead 7 and so that back and forth movement of the rotary part 40 through the ball chuck 11 due to the writing pressure of the lead 7 causes the rotary part 40 to rotate and rotational movement of the rotary part 40 is transmitted to the lead 7 through the ball check 11.

Referring to FIG. 10 to FIG. 14, a lead feedout mechanism and feedout adjustment mechanism will be explained. The lead feedout mechanism receives rotational drive force of the rotary part 40 of the rotation drive mechanism 30 and acts to feed out the lead 7 from the slider 9.

Figure 10:
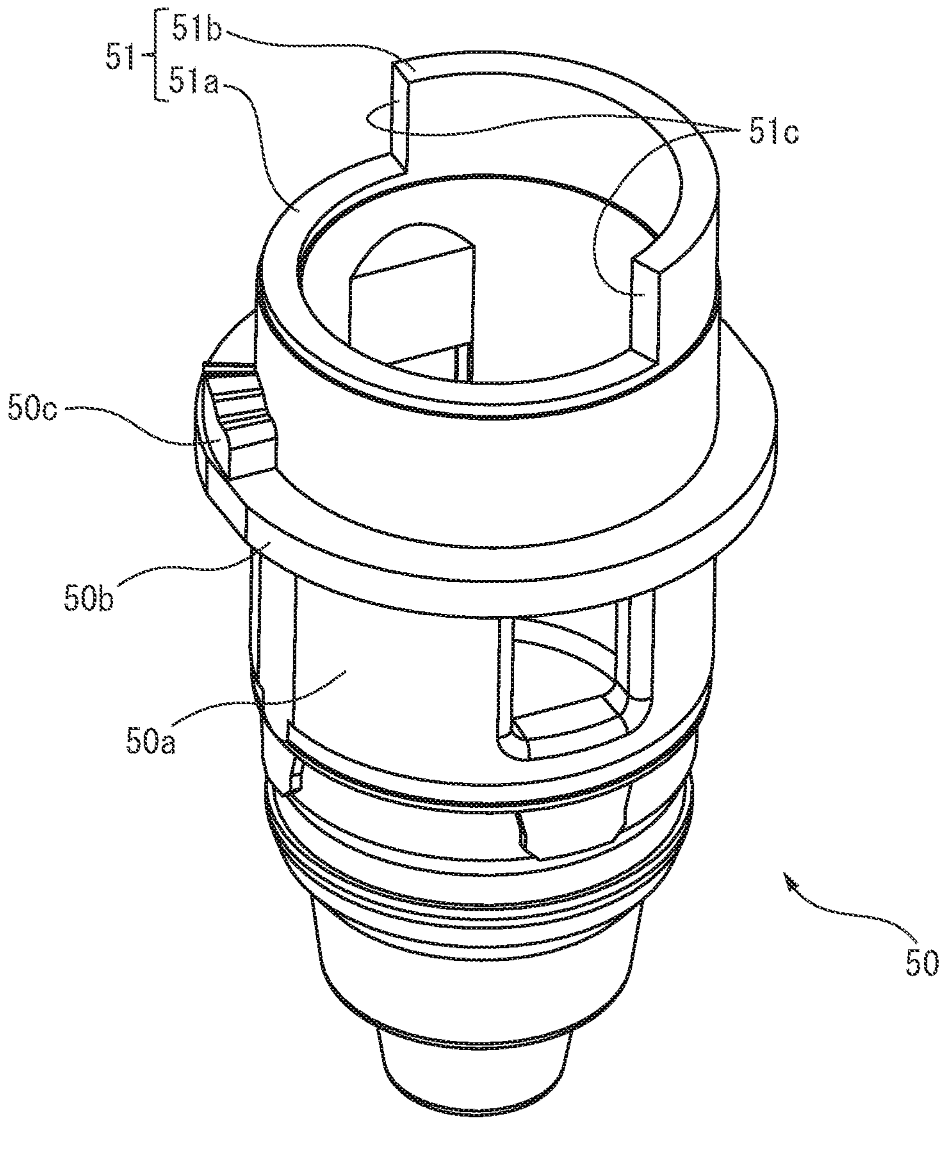
FIG. 10 is a perspective view of a dial cam member.

FIG. 10 is a perspective view of a dial cam member 50. The dial cam member 50 is arranged so that in FIG. 10, the upper part is the rear side of the mechanical pencil 1. The dial cam member 50 is a member formed in a cylindrical shape and has a cam body 50*a*, a flange part 50*b* formed at the outer circumferential surface of the cam body 50*a*, a fitting projection 50*c* formed at the rear end face of the flange part 50*b*, and a dial cam 51 formed at the rear end face of the cam body 50*a*. The dial cam 51 has a flat first ring shape cam face 51*a* positioned further to the front and perpendicular to the center axis and a flat second ring shape cam face 51*b* positioned further to the rear and perpendicular to the center axis. Further, the two ends of the first ring shape cam face 51*a* and second ring shape cam face 51*b* are connected by a vertical wall 51*c*.

Figure 11:
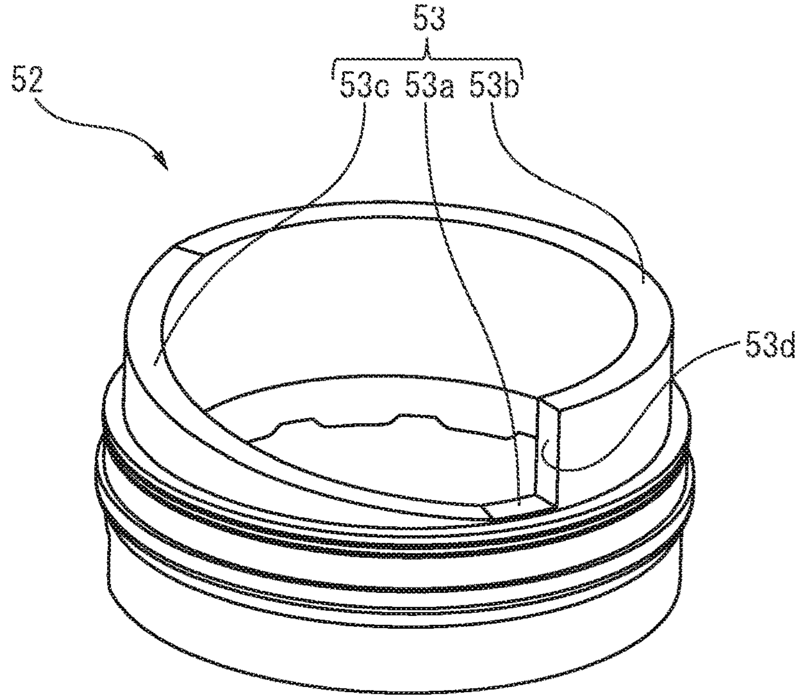
FIG. 11 is a perspective view of a rail cam member.
Figure 12:
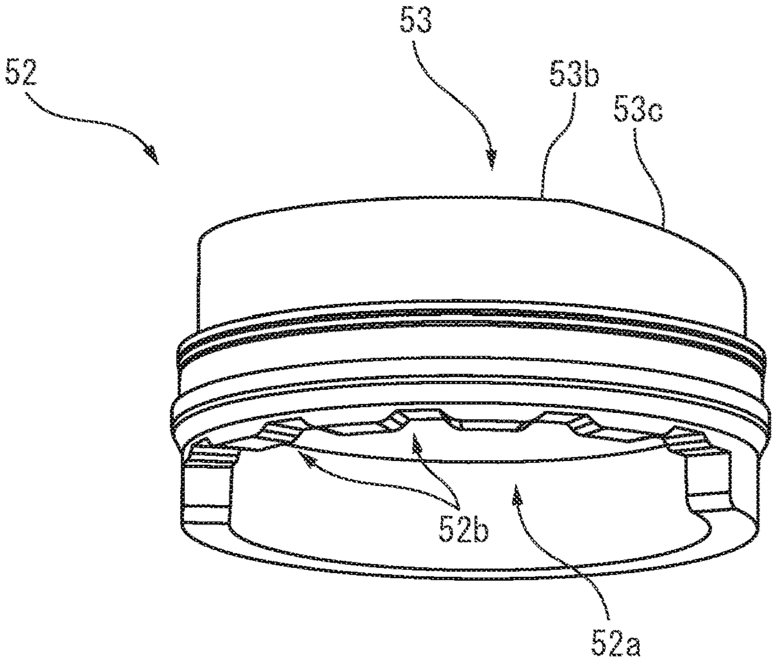
FIG. 12 is another perspective view of the rail cam member.

FIG. 11 is a perspective view of a rail cam member 52, while FIG. 12 is another perspective view of the rail cam member 52. The rail cam member 52 are arranged so that, at FIG. 11 and FIG. 12, the upper part is the rear side of the mechanical pencil 1. The rail cam member 52 is a member formed in a ring shape. At the front end face of the rail cam member 52, an adjusting recess 52*a* is formed. At the bottom surface of the adjusting recess 52*a*, a plurality of fitting recesses 52*b* arranged along the circumferential direction at equal intervals are formed.

At the rear end face of the rail cam member 52, a rail cam 53 is formed. The rail cam 53 has a flat first ring shape cam face 53*a* positioned further to the front and perpendicular to the center axis, a flat second ring shape cam face 53*b* positioned further to the rear and perpendicular to the center axis, and a slanted surface 53*c* constituted by a sloping ring shaped cam face provided so as to rise along the circumferential direction so as to connect ends of the first ring shape cam face 53*a* and second ring shape can face 53*b*. The other ends of the first ring shape cam face 53*a* and second ring shape cam face 53*b* are connected by a vertical wall 53*d*.

Figure 13:
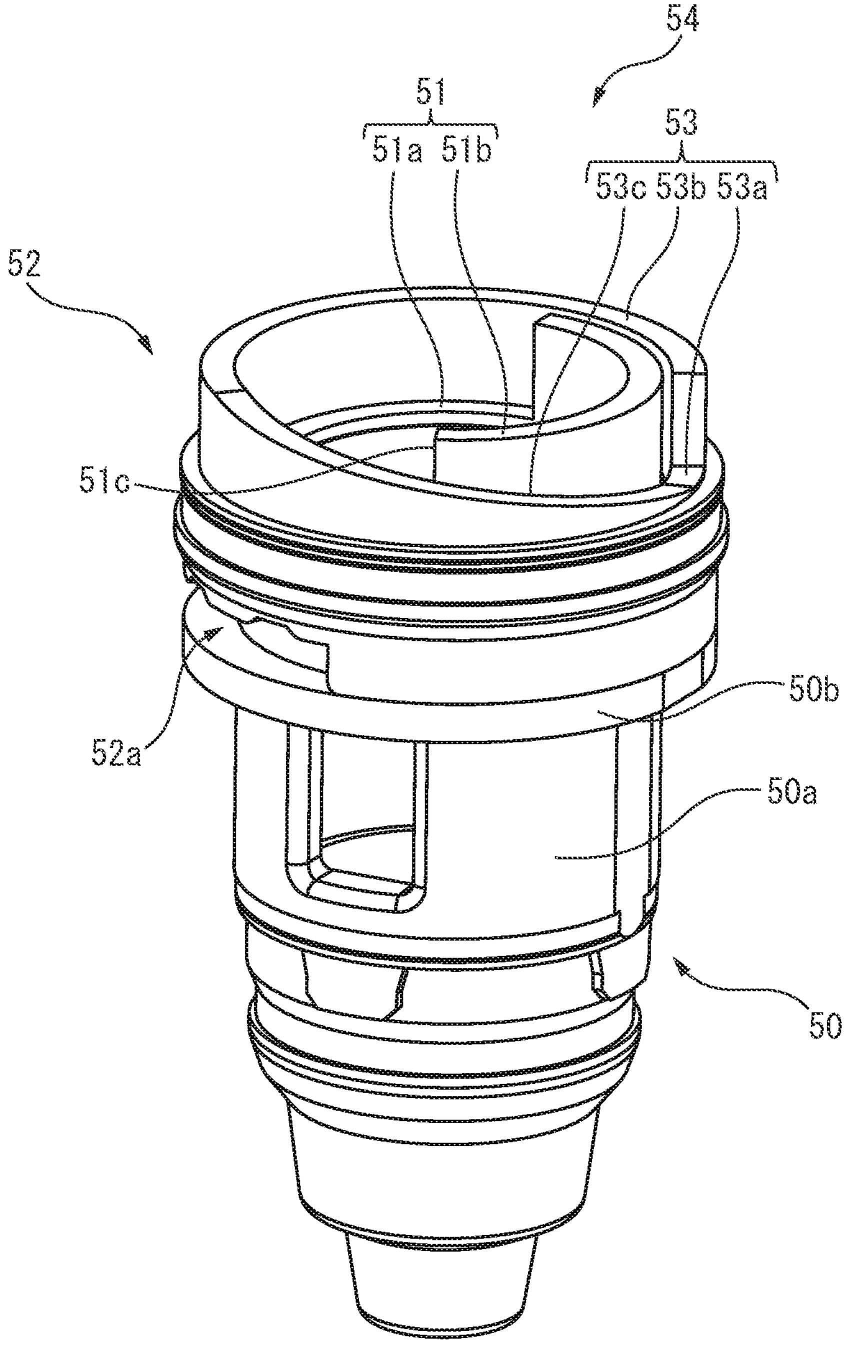
FIG. 13 is a perspective view of a combined dial cam member and rail cam member.
Figure 14:
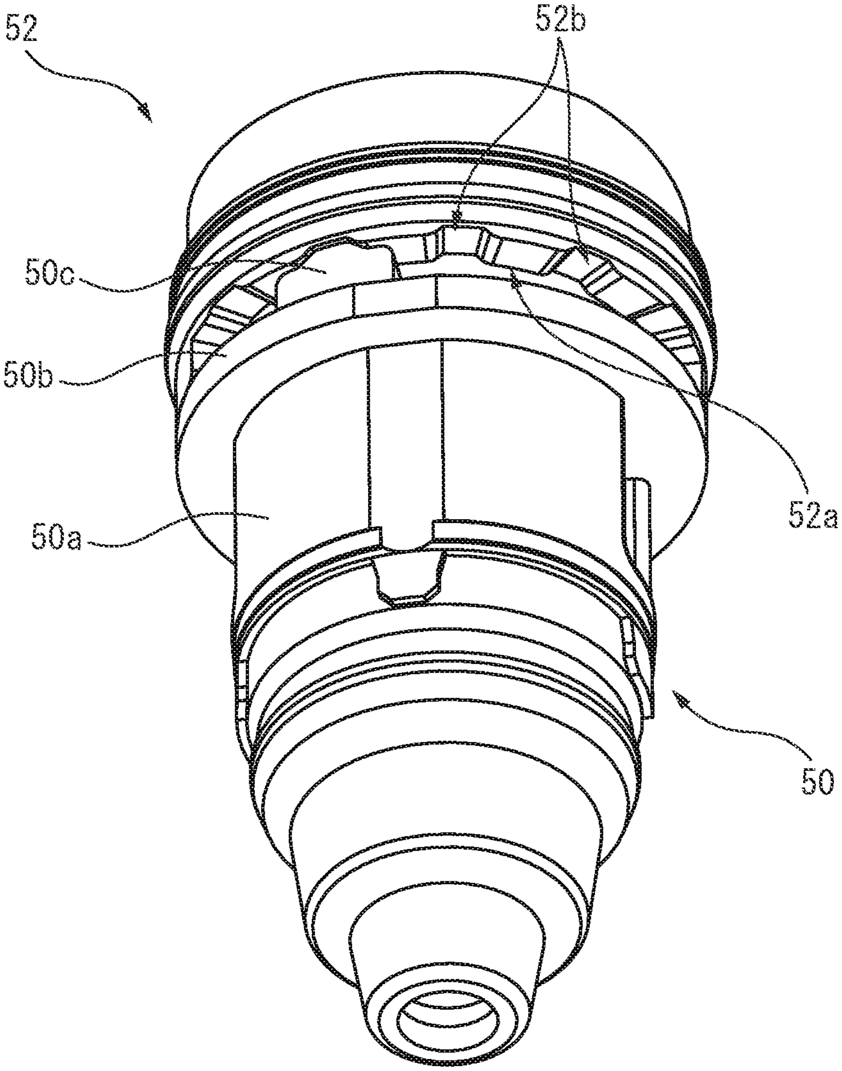
FIG. 14 is another perspective view of the combined dial cam member and rail cam member.

FIG. 13 is a perspective view of the combined dial cam member 50 and rail cam member 52, while FIG. 14 is another perspective view of the combined dial cam 50 member and rail cam member 52. The dial cam member 50 and rail cam member 52 are arranged so that, in FIG. 13 and FIG. 14, the upper part becomes the rear side of the mechanical pencil 1. The rail cam member 52 of the ring shape is inserted in the rear end part of the cam body 50*a* of the dial cam member 50 and stopped by the flange part 50*b* for combining them. In other words, the rear end surface of the flange part 50*b* of the dial cam member 50 is abutted against by the front end face of the rail cam member 52. At this time, the fitting projection 50*c* provided at the flange part 50*b* of the dial can member 50 fits with any fitting recess 52*b* of the adjustment recess 52*a* of the rail cam member 52. The rail cam member 52 is arranged at the outside of the dial cam member 50 in the diametrical direction.

In the state of the dial cam member 50 and the rail cam member 52 combined, the dial cam 51 of the dial cam member 50 is arranged in the vicinity of the rail cam 53 of the rail cam member 52. Due to this, the dial cam 51 and rail cam 53 cooperate to form the continuous, i.e., ring shaped, feedout cam face 54 in the circumferential direction.

As shown in FIG. 3, the dial cam member 50 and rail cam member 52 are arranged at the outside of the slider 9 in the combined state. Part of the dial cam member 50 and the rail cam member 52 are covered by the tip member 4 and holding part 8 at the outer circumferential surfaces. The holding part 8 engages with the outer circumferential surface of the dial cam member 50. Therefore, it can rotate about its center axis together with the dial cam member 50. Between the inside surface of the front end part of the tip member 4 and the flange part 50*b* of the dial cam member 50, a coil spring 56 is arranged. Further, the abutting part 65*c* biased to the front by the can abutting spring 18 through the slider 9 maintains the state abutting against the feedout cam face 54. The outer circumferential surface of the rail cam member 52 engages with the inner circumferential surface of the tip member 4 whereby rotation of the rail cam member 52 with respect to the tip member 4 and in turn the cylindrical barrel 6 is restricted.

The shape of the feedout cam face 54 can be changed by making the dial cam member 50 and rail cam member 52 relatively rotate about the center axis. Specifically, the user uses one hand to grip the cylindrical barrel 6 while uses the other hand to make the holding part 8 rotate to thereby make the dial cam member 50 rotate about its center axis. The rail cam member 52 engages with the cylindrical barrel 6, so the dial cam member 50 rotates relative the rail cam member 52 about its center axis. The rotation of the dial cam member 50 with respect to the rail cam member 52 is performed in stages so that the fitting projection 50*c* of the dial cam member 50 moves between and fits with adjoining fitting recesses 52*b* of the corresponding rail cam member 52. Therefore, the rotation of the dial cam member 50 with respect to the rail cam member 52 about its center axis is performed in stages in the range of the adjustment recess 52*a* of the rail cam member 52 at which the fitting projection 50*c* of the dial cam member 50 can move. The relative position of the dial cam 51 of the dial cam member 50 and the rail cam 53 of the rail cam member 52 changes in accordance with the position of the fitting recess 52*b* of the rail cam member 52 with which the fitting projection 50*c* of the dial cam member 50 fits. As a result, it is possible to change the shape of the feedout cam face 54. The dial cam member 50 is biased with respect to the rail cam member 52 by the coil spring 56 and a "click" feeling is obtained at the time of step-by-step rotation of the dial cam member 50 with respect to the rail cam member 52.

Figure 15:
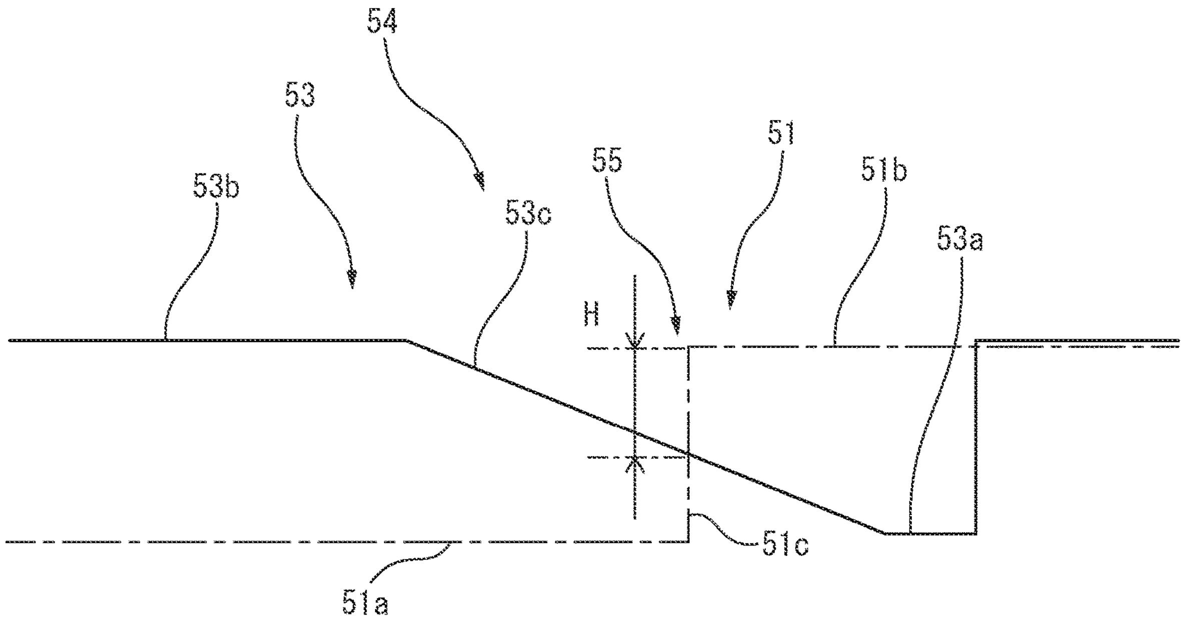
FIG. 15 is a schematic view showing a feedout face.

Next, referring to FIG. 15, feedout of lead 7 by the feedout cam face 54 will be explained. FIG. 15 is a schematic view showing the feedout cam face 54. FIG. 15 shows the positional relationship of the dial cam member 50 and rail cam member 52 by spreading open in the circumferential direction the cylindrical surface about the center axis including the feedout cam face 54. In FIG. 15, the upper part is the rear side of the mechanical pencil 1.

Referring to FIG. 15, the dial cam member 50 is made to be positioned relative to the rail cam member 52 so that the vertical wall 51*c* of the dial cam 51 and the slanted surface 53*c* of the rail cam 53 are arranged superposed in the diametrical direction. In FIG. 15, the line (surface) positioned further to the rear among the dial cam 51 and rail cam 53, i.e., positioned further to the upper in the drawing, forms the feedout cam face 54. In other words, the second ring shape cam face 51*b* of the dial cam 51 and the second ring shape cam face 53*b* and slanted surface 53*c* of the rail cam 53 cooperate to configure the feedout cam face 54. It should be noted that, at the feedout cam face 54, the height (height difference) of the step part 55 (drop difference) in the axial direction formed by the second ring shape cam face 51*b* of the dial cam 51 and the slanted surface 53*c* of the rail cam 53 is made the step height H.

If making the dial cam member 50 and rail cam member 52 relatively rotate about the center axis so that the vertical wall 51*c* of the dial cam 51 is arranged at the first ring shape cam face 53*a* side of the rail cam 53, the step height H becomes higher. On the other hand, if making the dial cam member 50 and rail cam member 52 relatively rotate about the center axis so that the vertical wall 51*c* of the dial can 51 is arranged at the opposite side from the first ring shape cam face 53*a* side of the rail cam 53, the step height H becomes lower.

The rotary part 40 of the rotation drive mechanism 30, as explained later, drives the abutting part 65*c* to gradually rotate based on the cushion motions of the lead 7. In other words, if viewing the front end part of the slider 9 as the front, the abutting part 65*c* rotates to the right about the center axis. Due to this rotational movement, the abutting part 65*c* biased to the front by the cam abutting spring 18 moves in the circumferential direction in cooperation with the feedout cam face 54. Stated otherwise, the abutting part 65*c* moves from the right to the left in FIG. 15, so moves so as to gradually rise along the slanted surface 53*c* of the dial cam 51 forming the feedout cam face 54.

If the abutting part 65*c* reaches the step part 55, it is pressed against by the biasing force of the cam abutting spring 18 and drops into the step part 55. In other words, the abutting part 65*c* moves further to the front from the second ring shape cam face 51*b* of the dial cam 51 by exactly the step height H of the step part 55. At that time, together with advance of the abutting part 65*c*, the slider 9 and further the holding chuck 10 arranged at the inside of the slider 9 similarly move to the front. As a result, the lead 7 held by the holding chuck 10 is pulled out from the ball chuck 11 and is fed out relative to the front end part of the slider 9 by exactly the amount of the step height H. Therefore, the amount of the lead 7 fed out, i.e., the feedout amount, is equal to the step height H.

Due to the above motion, it is possible to feed out the lead 7 from the slider 9 each time the abutting part 65*c* turns once along the feedout cam face 54. By repetition of this motion, the lead 7 is successively fed out while the lead 7 wears down along with writing.

In short, the lead feedout mechanism is configured so that the abutting part 65*c* moves along the feedout cam face 54 in accordance with rotation of the rotary part 40 and, due to the advancing motion of the slider 9 when the abutting part 65*c* drops into the step part 55 of the feedout cam face 54, the lead 7 held by the holding chuck 10 is pulled out from the ball chuck 11. Due to the lead feedout mechanism utilizing the step part 55 of the feedout cam face 54, it is possible to convert the rotational drive force of the rotary part 40 at the rotation drive mechanism 30 to feedout motion of the lead 7. The configuration forming the height difference of the feedout cam face 54 will be referred to as a "drop difference".

The mechanical pencil 1 is configured to receive the rotational drive force of the rotary part 40 at the rotation drive mechanism 30 and drive rotation of the lead 7 held by the ball chuck 11 as well. For this reason, it is possible to prevent the lead 7 from being unevenly worn along with further writing and possible to prevent the thickness of the drawn lines and the darkness of the drawn lines from greatly changing. In short, the rotation drive mechanism 30 has a rotary part 40, receives retracting motion in the axial direction due to writing pressure which the lead 7 gripped by the ball chuck 11 receives and advancing motion in the axial direction due to release of writing pressure, and drives the rotary part 40 to rotate in one direction.

In the feedout adjustment mechanism, as explained above, it is possible to just make the dial cam member 50 and rail cam member 52 relatively rotate about their center axes so as to change the step height H of the step part 55 at the feedout cam face 54. Accordingly, it is possible to more simply and accurately adjust the feedout amount of the lead 7 by the lead feedout mechanism.

If adjusting the extent of wear of the lead 7 due to the writing pressure which differs by user, the hardness of the lead 7 utilized, and other differences and the feedout amount of the lead 7 so as to substantially match, it is possible to keep the amount of projection of the lead 7 from the slider 9 constant at all times regardless of writing being performed. As a result, at the mechanical pencil 1, it is possible to continue writing for a long time by a single click operation. It is preferable to form the dial cam 51 or rail cam 53 so that a step part 55 is formed having a step height H corresponding to a length more than the extent of wear of the lead 7 normally envisioned. Due to this, it becomes possible to set the feedout amount of the lead 7 in accordance with the preferences of all users.

In the above-mentioned embodiments, the dial cam member 50 used as the first cam member was a cylindrical shaped member, but it may also be a ring shaped member. Further, the rail cam member 52 used as the second cam member was a ring shaped member, but it may also be a cylindrical shaped member. The first cam member may be provided with the rail cam 53 and the second cam member may be provided with the dial cam 51. In other words, the ring shaped or tubular shaped first cam member and the ring shaped or tubular shaped second cam member arranged at the outside of the first cam member in the diametrical direction may cooperate to form the feedout face. Further, by making the first cam member and second cam member move back and forth relative to each other, i.e., by making them separate in the axial direction, the step height of the step part may be adjusted.

It is also possible to configure the rail cam member 52 integrally with the dial cam member 50 and configure just a single feedout can face 54 by the dial cam member. In this case, it is not possible to adjust the feedout amount as explained above, but the number of parts becomes smaller and the costs can be cut. To adjust the feedout amount, it is also possible to prepare a plurality of dial cam members provided with various step heights H. In this case, it is possible for a user to select a dial cam member by which an optimal feedout amount for himself can be realized and exchange members.

Figure 16:
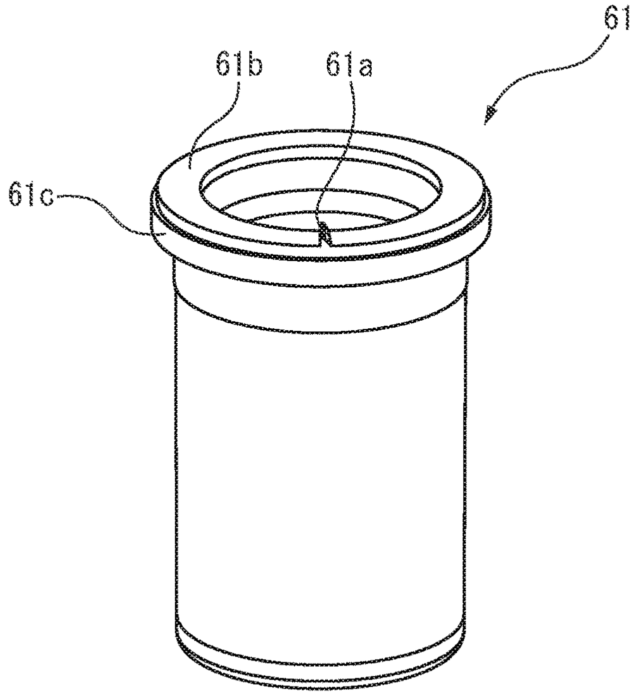
FIG. 16 is a perspective view of an input clutch cam.
Figure 17:
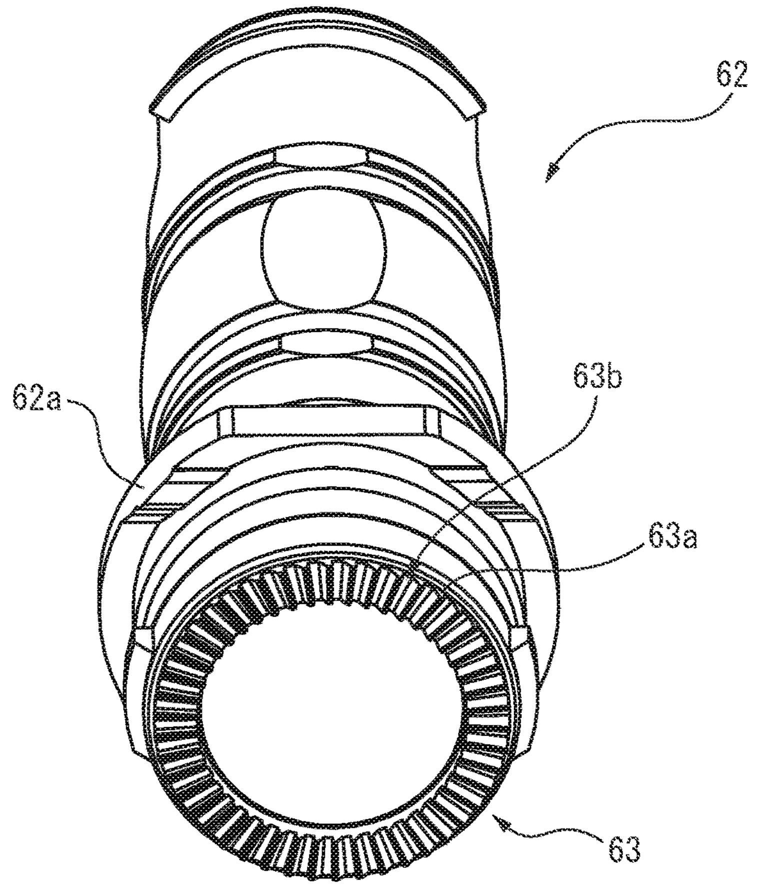
FIG. 17 is a perspective view of an output clutch cam.
Figure 18:
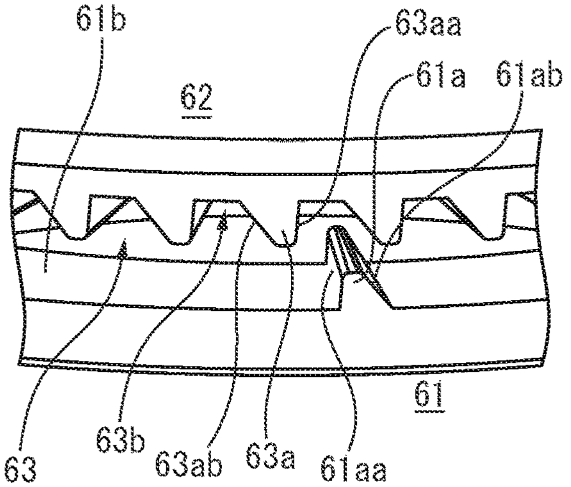
FIG. 18 is an enlarged perspective view for explaining the input clutch cam and the output clutch cam.

Next, while referring to FIG. 3, FIG. 5, FIG. 6, and FIG. 16 to FIG. 19, the clutch mechanism 60 will be explained. The clutch mechanism 60 acts to receive as input the rotational movement of the rotary part 40 at the rotation drive mechanism 30 and to output the rotational movement of the abutting part 65*c*. The clutch mechanism 60 has an input clutch cam 61 as an input member, an output clutch cam 62 as an output member, a transmission cam 64, and a feedout cam 65. Further, the mechanical pencil 1 further has a clutch cam holder 66, FIG. 16 is a perspective view of the input clutch cam 61, FIG. 17 is a perspective view of the output clutch cam 62, and FIG. 18 is an enlarged perspective view for explaining the input clutch cam 61 and output clutch cam 62. The input clutch cam 61 is arranged so that, in FIG. 16, the upper part become the rear side of the mechanical pencil 1 while the output clutch cam 62 is arranged so that, in FIG. 17, the upper part becomes the rear side of the mechanical pencil 1. In FIG. 18, the upper part is the rear side of the mechanical pencil 1.

The input clutch cam 61 is a cylindrical shaped member. At the ring shaped rear end face 61*b* forming the input cam face, a single cam projection 61*a* is provided. At outer circumferential surface of the rear end part of the input clutch cam 61, a flange part 61*c* is provided.

The output clutch cam 62 is arranged at the rear of the input clutch cam 61. The output clutch cam 62 is a cylindrical shaped member. At the outer circumferential surface in the vicinity of the front end part of the output clutch can 62, a flange part 62*a* is provided. At the ring shaped front end face of the output clutch cam 62, a clutch cam face 63 is provided as the output cam face. The clutch cam face 63 is arranged facing the cam projection 61*a* of the input clutch cam 61. The clutch cam face 63 is comprised of a plurality of peaks 63*a* and a plurality of valleys 63*b* provided with flat bottom surfaces provided between adjoining peaks 63*a*.

Referring to FIG. 18, the cam projection 61*a* of the input clutch cam 61 and the peaks 63*a* of the output clutch cam 62 are substantially the same shape. The cam projection 61*a* of the input clutch cam 61 has a first engagement surface 61*aa* approximately vertical to the rear end face 61*b* and a first slanted surface 61*ab* slanted with respect to the same. Similarly, each peak 63*a* of the output clutch cam 62 has a second engagement surface 63*aa* approximately vertical to the bottom surface of a valley 63*b* and a second slanted surface 63*ab* slanted with respect to the same. As explained later, in motion of the clutch mechanism 60, the first engagement surface 61*aa* of the input clutch cam 61 and the second engagement surface 63*aa* of the output clutch cant 62 engage so that the input clutch cam 61 and output clutch cam 62 cooperate.

Referring to FIG. 3, FIG. 5, and FIG. 6, at the outer circumferential surface of the front end part of the output clutch cam 62, the rear end part of the transmission cam 64 is fit. The transmission cam 64 is inserted until the rear end face of the transmission cam 64 abuts against the flange part 62*a* of the output clutch cam 62. The transmission cam 64 is formed in a cylindrical shape. At its front end face, first engagement projections 64*a* extending toward the front and arranged at equal intervals along the circumferential direction are provided. At the side surfaces of the first engagement projections 64*a* in the circumferential direction, first engagement walls 64*b* extending along the axial direction are provided. At the inner circumferential surface of the transmission cam 64, a ring shaped projection 64*c* is provided.

The input clutch cam 61 is arranged inside the transmission cam 64 so that the flange part 61*c* is arranged between the clutch cam face 63 of the output clutch cam 62 and the ring shaped projection 64*c* of the transmission cam 64. In other words, advance of the input clutch cam 61 is restricted by the flange part 61*c* being stopped by the ring shaped projection 64*c* of the transmission cam 64. Retraction of the input clutch cam 61 is restricted by cooperation of the cam projection 61*a* and the clutch cam face 63 of the output clutch cam 62.

At the front of the transmission cam 64, the feedout cam 65 is arranged. The feedout cam 65 is formed in a cylindrical shape. At the rear end face thereof, second engagement projections 65*a* are provided extending toward the rear and arranged at equal intervals along the circumferential direction. The second engagement projection 65*a* are complementary in shape with the first engagement projection 64*a* of the transmission cam 64. At the side surfaces of the second engagement projections 65*a* in the circumferential direction, second engagement walls 65*b* are provided along the axial direction. At the front end face of the feedout cam 65, as explained above, a single abutting part 65*c* of a projection shape projecting out to the front is provided. At the inner circumferential surface of the front end part of the feedout cam 65, a ring shaped projection 65*d* is provided.

Inside of the feedout cam 65, the slider 9 is inserted from the rear. The flange part 9*a* and the ring shaped projection 65*d* of the feedout cam 65 can engage with each other. The above-mentioned cam abutting spring 18 is arranged so that one end engages with the inside surface of the flange part 9*a* of the slider 9 and the other end engages with the front end face of the input clutch cam 61. Due to the biasing force of the cam abutting spring 18, the slider 9 is biased to the front. Through the flange part 9*a* of the biased slider 9, the feedout cam 65 is biased to the front. As a result, the abutting part 65*c*, as explained above, is biased to abut against the feedout cam face 54. The feedout cam 65 can move integrally with the slider 9 in the axial direction, while can rotate independently of it about its center axis.

The clutch cam holder 66 is formed in a cylindrical shape and is attached to the cylindrical barrel 6, specifically the inside surface of the front shaft 2. At the inner circumferential surface of the clutch cam holder 66, as a high viscosity material, grease or another liquid lubricant is applied. Inside the clutch cam holder 66, the output clutch cam 62 is inserted. Due to this, liquid lubricant is filled between the outer circumferential surface of the output clutch cam 62 and the inner circumferential surface of the clutch cam holder 66. As a result, the output clutch cam 62 and the connected transmission cam 64 are gently held by the clutch cam holder 66 and rapid movement in the axial direction in the cylindrical barrel 6 due to gravity etc. is eased. The clutch cam holder 66 may also be provided integrally with the cylindrical barrel 6. In other words, between the output member and the cylindrical barrel, a viscous fluid suppressing movement of the output member in the axial direction is arranged. Due to the mechanical pencil 1 having the clutch can holder 66, it is possible to absorb variation in dimensions of parts of the clutch mechanism 60, the effects of frictional resistance, etc. It should be noted that the clutch cam holder 66 may also be omitted.

Referring to FIG. 3, as explained above, at the inner circumferential surface of the front end part of the input clutch cam 61, the outer circumferential surface of the rear end part of the fastener 13 of the ball chuck 11 is fit. At the inner circumferential surface of the rear end part of the input clutch cam 61, the outer circumferential surface of the front end part of the relay member 12 is fit. The rear end part of the relay member 12 is connected to the rotary part 40 (FIG. 4). Therefore, the input clutch cam 61 is driven to rotate by the rotary part 40 by the rotation drive mechanism 30 through the relay member 12. Further, the input clutch cam 61 moves back and forth together with the rotary part 40 through the relay member 12 based on the cushion motions of the lead 7. The relay member 12 runs through the insides of the output clutch cam 62 and transmission cam 64 and is separated from the relay member 12. Therefore, rotational movement and back and forth movement of the relay member 12 are not directly transmitted to the output clutch cam 62 and transmission cam 64.

Figure 19:
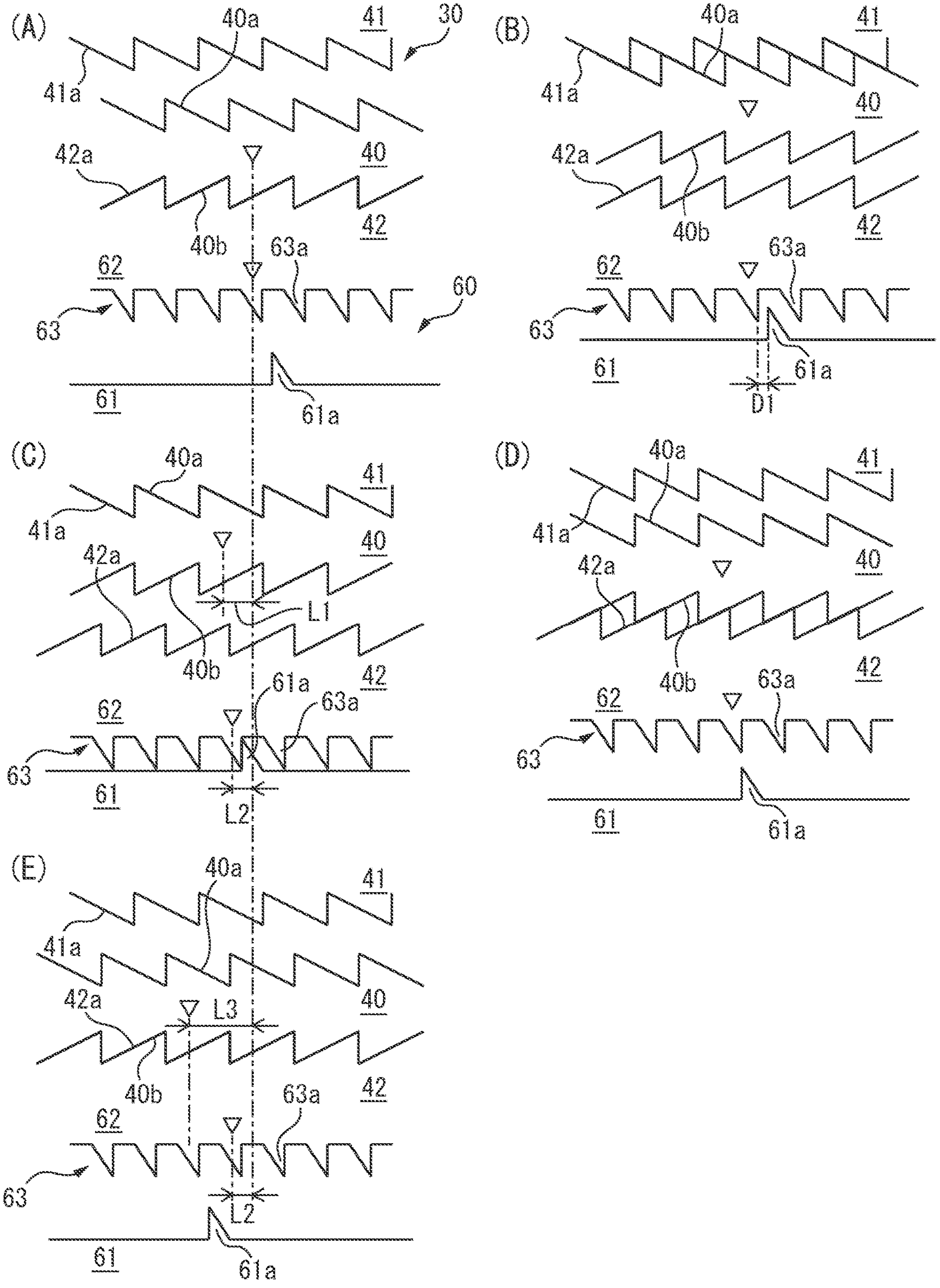
FIG. 19 is a schematic view for explaining operation of the clutch mechanism cooperating with the rotation drive mechanism.

The rotational movement of the input clutch can 61, as explained later referring to FIG. 19, is transmitted to the output clutch cam 62 by the cam projection 61*a* and the clutch cam face 63 of the output clutch cam 62 cooperating. The rotational movement of the output clutch cam 62 is transmitted to the feedout cam 65 through the connected transmission cam 64. In other words, along with rotation of the transmission cam 64, the first engagement wall 64*b* of the first engagement projection 64*a* engages with the second engagement wall 65*b* of the second engagement projection 65*a* in the circumferential direction and transmits rotational movement of the transmission cam 64 to the feedout can 65. As a result, the abutting part 65*c*, as explained above, moves along the feedout cam face 54 whereby the lead 7 is fed out.

FIG. 19 is a schematic view for explaining motion of the clutch mechanism 60 in cooperation with the rotation drive mechanism 30. FIG. 19 spreads open the cylindrical surface about the center axis including each of cam faces in circumferential direction so as to show the positional relationship among the rotary part 40, the upper cam-forming member 41 and the lower cam-forming member 42 in the rotation drive mechanism 30, and the input clutch cam 61 and output clutch cam 62 in the clutch mechanism 60. In FIG. 19, the upper parts are the rear side of the mechanical pencil 1, The states of the rotation drive mechanism 30 shown in (A) to (E) of FIG. 19 respectively correspond to the states of the rotation drive mechanism 30 shown in (A) to (C) of FIG. 8 and (D) to (E) of FIG. 9. At each of the rotary part 40 and output clutch cam 62, a triangular mark is added to show the amount of rotational movement.

(A) of FIG. 19 shows the relationship of the rotation drive mechanism 30 and clutch mechanism 60 in the state where writing pressure is not applied to the lead 7. The rotation drive mechanism 30 is in the state shown in (A) of FIG. 8. Therefore, the second cam face 40*b* of the rotary part 40 meshes with the second fixed cam face 42*a* of the lower cam-forming member 42. At this time, the cam projection 61*a* of the input clutch cam 61 and the clutch cam face 63 of the output clutch cam 62 are separated in the axial direction and do not abut against each other. The triangular marks attached at the rotary part 40 and output clutch cam 62 are arranged on the same line in the axial direction.

Next, (B) of FIG. 19 shows the initial state where writing pressure is applied to the lead 7. The rotation drive mechanism 30 is in the state shown in (B) of FIG. 8. Therefore, in this state, the rotary part 40 moves to the upper cam-forming member 41 side and the input clutch cam 61 approaches the clutch cam face 63 of the output clutch cam 62. At this time, the first engagement surface 61*aa* of the cam projection 61*a* of the input clutch cam 61 and the second engagement surface 63*aa* of the peak 63*a* of the output clutch cam 62

(FIG. 18) are separated in the circumferential direction. Specifically, they are separated by exactly the distance D1 in the circumferential direction.

Next, (C) of FIG. 19 shows the state where writing pressure is further applied to the lead 7 and the first cam face 40*a* of the rotary part 40 meshes with the first fixed cam face 41*a* of the upper cam-forming member 41. The rotation drive mechanism 30 is in the state shown in (C) of FIG. 8. Therefore, the rotary part 40 receives rotational drive force corresponding to half of the phase (half pitch) of one tooth of the first cam face 40*a*. In other words, the rotary part 40 rotates by exactly a rotational angle corresponding to the distance L1 of the amount of rotational movement in the circumferential direction from the state shown in (A) of FIG. 19. Along with rotational drive of the rotary part 40, the cam projection 61*a* of the input clutch cam 61 and the peaks 63*a* of the output clutch cam 62 engage and the output clutch cam 62 is driven to rotate through the input clutch cam 61. As shown in (B) of FIG. 19 right before that, the cam projection 61*a* of the input clutch cam 61 and the peaks 63*a* of the output clutch cam 62 are separated in the circumferential direction, so the amount of rotational movement of the output clutch cam 62 is smaller than the distance L1 of the amount of rotational movement of the input clutch cam 61, i.e., the distance L1 of the amount of rotational movement of the rotary part 40. Specifically, the amount of rotational movement of the output clutch cam 62 is the distance L2 of the distance L1 minus the distance D1. Therefore, the output clutch cam 62 rotates by exactly a second rotational angle corresponding to the distance L2.

Next, (D) of FIG. 19 shows the initial state where writing pressure on the lead 7 is released. The rotation drive mechanism 30 is in the state shown in (D) of FIG. 9. Therefore, in this state, the rotary part 40 moves to the lower cam-forming member 42 side due to the biasing force of the cushion spring 45 and the cam projection 61*a* of the input clutch cam 61 separates from the clutch cam face 63 of the output clutch cam 62.

Next, (E) of FIG. 19 shows that state where the second cam face 40*b* of the rotary part 40 meshes with the second fixed cam face 42*a* of the lower cam-forming member 42 due to the biasing force of the cushion spring 45. The rotation drive mechanism 30 is in the state shown in (E) of FIG. 9. Therefore, the rotary part 40 again receives rotational drive force corresponding to half of the phase (half pitch) of one tooth of the second cam face 40*b*. In other words, the rotary part 40 and, further, the input clutch cam 61 connected to the rotary part 40 rotate from the state shown in (A) of FIG. 19 by exactly a first rotational angle corresponding to the distance L3 of the amount of rotational movement corresponding to one phase (one pitch). On the other hand, the cam projection 61*a* of the input clutch cam 61 and the peaks 63*a* of the output clutch cam 62 are separated in the axial direction, so the first engagement surface 61*aa* of the input clutch cam 61 and the second engagement surface 63*aa* of the output clutch cam 62 do not engage and therefore the output clutch cam 62 is not driven to rotate. It should be noted that the input clutch cam 61 and the output clutch cam 62 are configured to cooperate only at the first engagement surface 61*aa* of the input clutch cam 61 and the second engagement surface 63*aa* of the output clutch cam 62 and to not cooperate at parts other than the same.

Due to one back and forth motion of the rotary part 40 in the axial direction due to writing, the rotary part 40 and input clutch cam 61 move rotating corresponding to one tooth of the cam of the rotation drive mechanism 30, but the output clutch cam 62 moves to rotate by less than that. In other words, the clutch mechanism 60 is configured so as to transmit rotational movement of the input clutch cam 61 to the output clutch cam 62 so that when the input clutch cam 61 rotates by exactly a first rotational angle, the output clutch cam 62 rotates by exactly a second rotational angle smaller than the first rotational angle. The pitch of the cam at the clutch mechanism 60 is set smaller than the pitch of the cam at the rotation drive mechanism 30. Specifically, the output clutch cam 62 is driven to rotate by exactly a rotational angle (second rotational angle) of the difference of the rotational angle (first rotational angle) corresponding to one tooth of the cam of the rotation drive mechanism 30 and the rotational angle corresponding to one tooth of the cam of the clutch mechanism 60.

For example, assume the number of teeth A of the first cam face 40*a* of the rotary part 40 or other rotation drive mechanism 30 is 40 and the number of teeth B of the clutch cam face 63 of the output clutch cam 62 is 46. The number of times of back and forth motion required for the rotary part 40 to rotate by one turn, i.e., the number of strokes of the number of writing motions, becomes 40 strokes. The rotational angle C of the rotary part 40 per stroke is 360/A, so 360/40=9 degrees. The rotational angle D corresponding to the distance between adjoining peaks 63*a* of the output clutch cam 62 is 360/D, so 360/46=7.83 degrees. This being so, as explained while referring to FIG. 19, the rotational angle E of the output clutch cam 62 per stroke is C-D, so 9-7.83==1.17 degrees. Therefore, the number of strokes required for the output clutch cam 62 to rotate by one turn is 360/1.17=307.7 strokes, in short, 308 strokes. If expressing this by the deceleration ratio, 1/(C/E)=1/7.69.

According to the clutch mechanism 60, it is possible to increase the number of strokes required in order for the output clutch cam 62 and in turn the abutting part 65*c* of the feedout cam 65 to turn once (for example, to 308 strokes) over the number of strokes required in order for the rotary part 40 to turn once (for example, 40 strokes). Further, by adjusting the number of teeth A of the cam of the rotation drive mechanism 30 and/or the number of teeth B of the cam of the clutch mechanism 60, it is possible to make the rotary part 40 turn once by any number of strokes and make lead be fed out by any number of strokes.

The output clutch cam 62 and the transmission cam 64 may also be integrally formed. The output clutch cam 62, transmission cam 64, and feedout cam 65 may together be defined as the "output member", The slider 9 and feedout cam 65 may also be integrally formed. The input clutch cam 61 had a single cam projection 61*a* as an input cam face, but may also have a plurality of cam projections 61*a*. The input cam face of the input clutch cam 61 and the clutch cam face 63 as the output cam face of the output clutch cam 62 may be formed in any way so long as they engage in movement in the circumferential direction and do not engage in movement in the axial direction such as in the relationship of the first engagement surface 61*aa* and the second engagement surface 63*aa*. Similarly, the transmission cam 64 and the feedout cam 65 may be formed in any way so long as they engage in movement in the circumferential direction and do not engage in movement in the axial direction such as in the relationship of the first engagement wall 64*b* and the second engagement wall 65*b*.

In the above-mentioned embodiments, as the input member and output member, engagement clutches of the input clutch cam 61 and output clutch cam 62 are employed. In other words, the clutch mechanism 60 is formed with an input cam face at the input member and an output cam face facing the input cam face at the output member and is configured so that the input cam face and output cam face engage at only part of the rotational movement of the rotary part and so that rotational movement of the rotary part is transmitted to the output member through the input member.

However, as the clutch mechanism, a friction clutch may be employed. In other words, it is possible to make disk plates or conical members face each other as the input member and output member and use frictional force to convert rotational movement of the rotary part 40 through the relay member 12 so that when the input member rotates by exactly a first rotational angle, the output member rotates by exactly a second rotational angle smaller than the first rotational angle. At the input member and output member, it is also possible to change the shapes or materials, surface roughness, etc. at the abutting surface between the disk shaped or conical shaped abutting faces arranged facing each other so as to adjust the frictional force acting and thereby adjust the rotational angle transmitted from the input member to the output member. Due to this, it is possible to make the rotary part 40 turn once by any number of strokes and to feed out lead by any number of strokes. The abutting surfaces between the input member and output member may, for example, be comprised of rubber, sandpaper, etc. Besides the claw clutch and friction clutch, any other clutch mechanism may be employed.

In the above-mentioned embodiments, the ball chuck 11 and the input clutch cam 61 were connected, so they were configured so that the ball chuck 11 rotated receiving rotational drive force of the rotary part 40 through the relay member 12 and input clutch cam 61 and thereby the lead 7 rotated. However, the ball chuck 11 and input clutch cam 61 need not be connected. In short, the clutch mechanism may also be applied to a mechanical pencil not configured so that the lead rotates.

In a state after the lead 7 is pulled out from the ball chuck 11 due to a click operation or due to motion of the lead feedout mechanism and before writing pressure is applied to the lead 7, in structure, there would be room for further retraction (backlash). For this reason, if the actual amount of feedout of lead 7 is small, sometimes the lead 7 fed out due to the backlash retracts and lead 7 is not substantially fed out.

According to the clutch mechanism, it is possible to delay the timing or frequency of feedout of the lead 7 by the lead feedout mechanism. For this reason, according to the clutch mechanism, it is possible to feed out more lead 7 after the lead 7 is worn down and possible to substantially prevent lead 7 from not being fed out due to the effect of backlash. The amount of feedout of lead can be changed by adjusting the step height H of the lead feedout mechanism as explained above. Accordingly, according to the above-mentioned embodiments, it is possible to provide a mechanical pencil provided with a lead feedout mechanism enabling more reliable feedout of lead.

Figure 20:
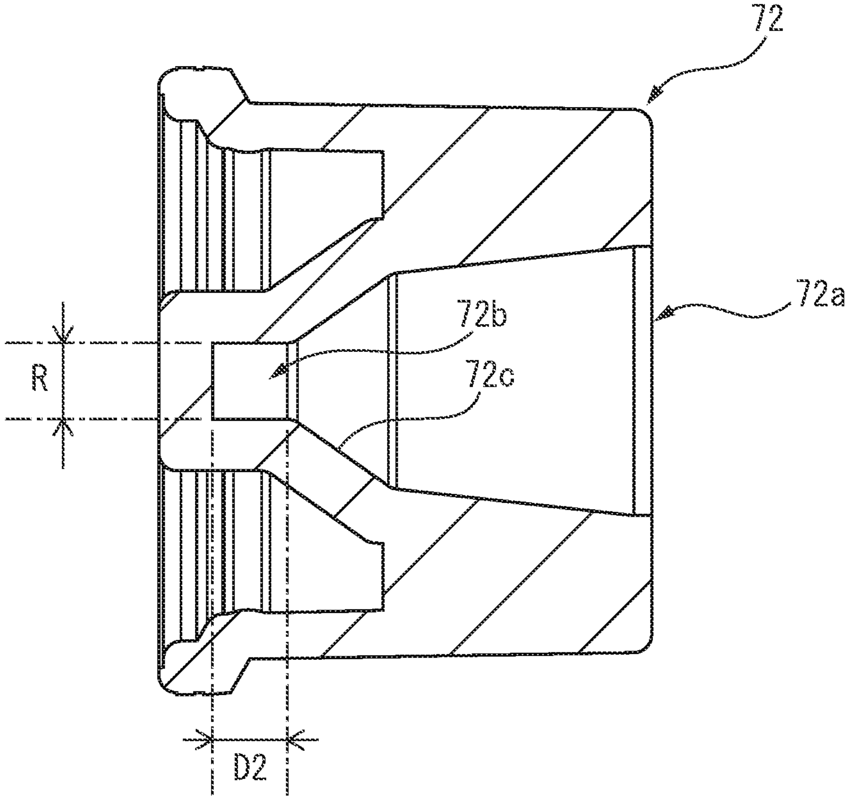
FIG. 20 is a vertical cross-sectional view of a lead feedout member.
Figure 21:
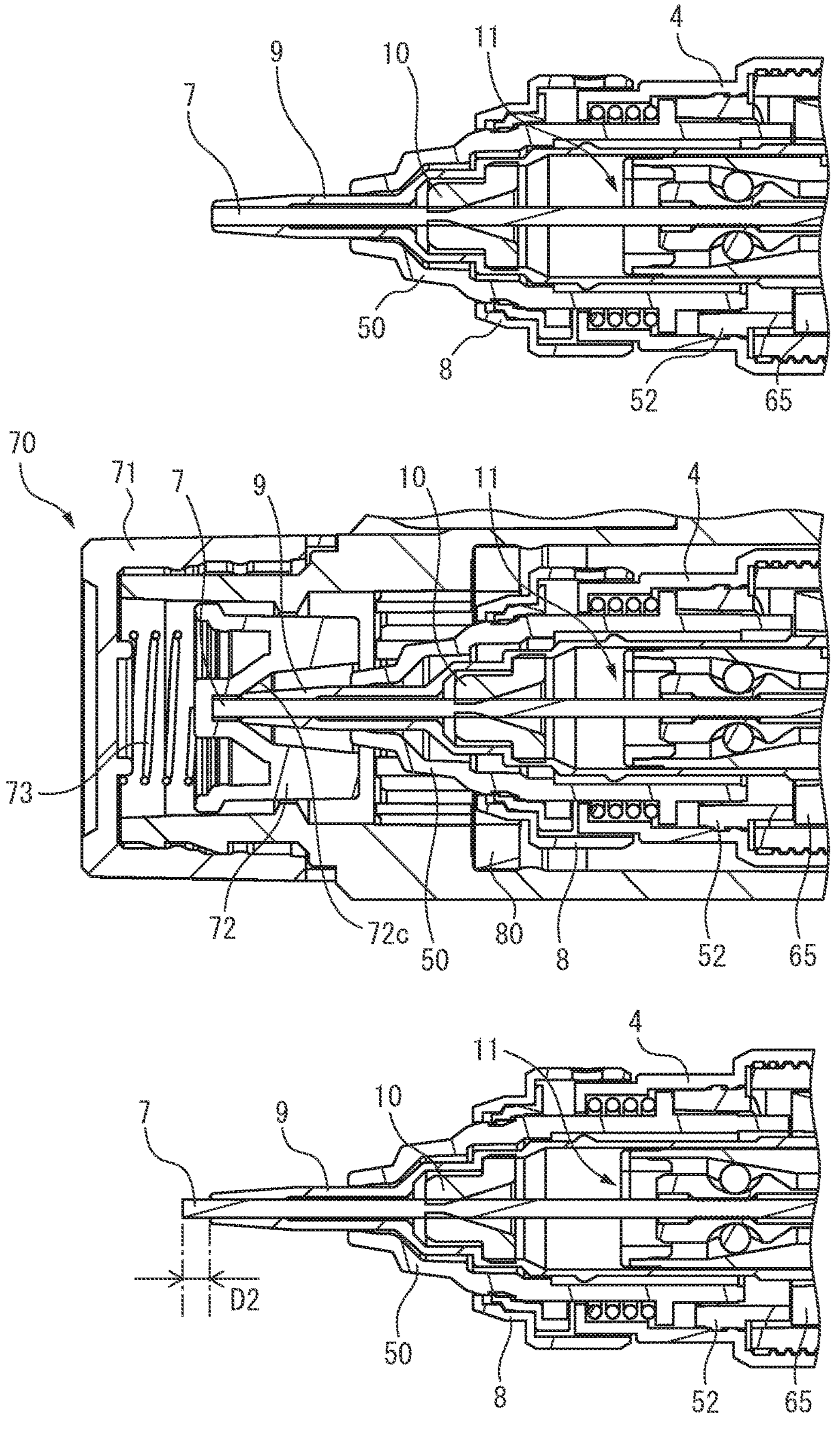
FIG. 21 is an enlarged perspective view of the mechanical pencil for explaining feedout of lead.

As shown in FIG. 1, the mechanical pencil 1 further has a cap 70 provided with a clip 70*a* and fitting with the cylindrical barrel 6. The cap 70 has a cover cap 71, a lead feedout member 72 of a lead feedout part, and a cushion spring 73. In this Description, in the axial direction of the cap 70, the closed end side is defined as the “front” side and the open end side is defined as the “rear” side. Referring to FIG. 20 and FIG. 21, a lead feedout mechanism utilizing the lead feedout part of the cap 70 will be explained.

As shown in FIG. 1 and (B) of FIG. 21, the cover cap 71 is a cap shaped member with a closed front end part. By attaching the cover cap 71 to the front end part of the cap 70, the closed end of the cap 70 is formed. The lead feedout member 72 is arranged at the inside of the front end of the cap 70 to be able to move back and forth. Between the cover cap 71 and the lead feedout member 72, a cushion spring 73 is arranged. The cushion spring 73 biases the lead feedout member 72 to the rear.

FIG. 20 is a vertical cross-sectional view of the lead feedout member 72. The lead feedout member 72 is a columnar shaped member. In FIG. 20, it is arranged so that the left is the front side of the cap 70. At the rear end face of the lead feedout member 72, the front end of the mechanical pencil 1, i.e., the insertion hole 72*a* of the circular opening into which the slider 9 etc. are inserted, is provided. At the bottom surface of the insertion hole 72*a*, a receiving recess 72*b* provided with a cylindrical shaped inner circumferential surface with an inside diameter R smaller than the the inlet of the insertion hole 72*a* and with a depth D2 is provided. At the rear of the receiving recess 72*b*, a tapered surface 72*c* is provided. The inside diameter R of the receiving recess 72*b* is set in accordance with the outside diameter of the lead 7 used at the mechanical pencil 1. Specifically, the inside diameter R of the receiving recess 72*b* is set just slightly larger than the outside diameter of the lead 7 and is set so that the front end of the lead 7 is received in it.

FIG. 21 is an enlarged cross-sectional view of the mechanical pencil 1 for explaining feedout of the lead 7. (A) of FIG. 21 shows a state of the mechanical pencil 1 before feedout of lead 7 where the cap 70 is not fit with the cylindrical barrel, (B) of FIG. 21 shows a state of the mechanical pencil 1 in the state where the cap 70 is fit with the cylindrical barrel 6, and (C) of FIG. 21 shows the state of the mechanical pencil 1 after feedout of the lead 7 along with detaching the cap 70 from the cylindrical barrel 6.

In (A) of FIG. 21, the lead 7 does not project out from the slider 9. In other words, this shows the state where the user finishes the series of writing motions, then makes the lead 7 retract so as not to project out from the slider 9 so as to protect the lead 7.

Next, as shown in (B) of FIG. 21, the cap 70 is made to fit with the cylindrical barrel 6. At this time, the front end of the mechanical pencil 1, i.e., the lead 7 and the front end part of the slider 9, are inserted into the insertion hole 72*a* of the lead feedout member 72. As explained above, the inside diameter R of the receiving recess 72*b* is set corresponding to the outside diameter of the lead 7, so the receiving recess 72*b* receives the front end of the lead 7. On the other hand, the outside diameter of the front end part of the slider 9 is set larger than the inside diameter R of the receiving recess 72*b*. Therefore, along with being inserted inside of the cap 70, the front end part of the slider 9 engages with the tapered surface 72*c* without being received in the receiving recess 72*b*. As a result, the slider 9 relatively retracts from the lead 7 inside the cylindrical barrel 6 and as a result the lead 7 projects out from the front end part of the slider 9 inside of the cap 70 by exactly the same length as the depth D2 of the receiving recess 72*b*.

Next, as shown in (C) of FIG. 21, the cap 70 is detached from the cylindrical barrel 6 so as to start the next writing. At this time, the retracted slider 9 and the holding chuck 10 arranged inside the slider 9 advance by the biasing force of the cam abutting spring 18. As a result, the lead 7 held by the holding chuck 10 is pulled out from the ball chuck 11 and is fed out relatively by exactly the amount of the depth D2 of the receiving recess 72*b* from the front end part of the slider

9. Therefore, the amount of the lead 7 fed out, i.e., the feedout amount, is equal to the depth D2 of the receiving recess 72*b*.

In general, if a user finishes one series of writing, the lead is made to retract so that it does not project from the tip member or slider so as to protect the lead. For this reason, before starting the next writing, it is necessary to perform at least one click operation and feed out lead in advance. Even with a mechanical pencil provided with the above-mentioned lead feedout mechanism, writing is necessary for automatically feeding out lead, so before starting writing, it is necessary to perform the click operation at least once and feed out lead in advance.

According to the lead feedout member 72, the lead 7 is fed out just by attaching and detaching the cap 70 to and from the cylindrical barrel 6. In other words, it is possible to obtain a state where the lead is fed out without a click operation before starting writing. Therefore, it is possible to provide a mechanical pencil enabling a new lead feedout operation different from a conventional click operation.

It should be noted that, even in the case of making the cap 70 fit with the cylindrical barrel 6 in the state with the lead 7 projecting out from the slider 9 longer than the depth D2 of the receiving recess 72*b*, the amount of projection of the lead 7 does not change. In other words, in this state, the front end part of the slider 9 does not engage with the taper surface 72*c* and therefore the slider 9 does not retract relative to the lead 7 inside the cylindrical barrel 6. At this time, the lead feedout member 72 is pressed by the front end of the lead 7 projecting out longer, but the pressing force is absorbed by the lead feedout member 72 advancing against the biasing force of the cushion spring 73.

It is also possible to detach the cover cap 71 and exchange the lead feedout member 72. In other words, the amount of projection of the lead 7 may differ by the preference of the user. For example, there will be users who will feel it convenient having the lead 7 sufficiently project out as it enables longer writing and users who will feel it preferable having the lead 7 not project out further as it eliminates the need to worry about the lead 7 breaking. Therefore, it is also possible to prepare in advance lead feedout members 72 provided with receiving recesses 72*b* of various depths D2 and exchange them in accordance with the preference of the user. It is also possible to omit the cushion spring 73 and arrange the lead feedout member 72 fixed inside the front end of the cap 70.

The lead feedout part of the lead feedout member 72 may be configured in any way so long as it is possible to press against the slider 9 to make the slider 9 retract from the lead 7 if fitting the cap 70 with the cylindrical barrel 6. In other words, so long as, at the time of fitting the cap 70, the front end of the lead 7 is received inside the receiving recess 72*b* and the front end part of the slider 9 is engaged and retracts without being received inside the receiving recess 72*b*, the receiving recess 72*b* may be made any shape etc. For example, there may be a plurality of projections formed at the inner circumferential surface of the cap 70 and extending inward so as to make the slider 9 retract from the lead 7 at the time of fitting the cap 70.

In the above-mentioned embodiments, to make the lead feedout mechanism act, the slider 9 was biased by the cam abutting spring 18 to the front. However, the lead feedout member 72 of the cap 70 may also be applied to a mechanical pencil where the slider is not biased to the front. A mechanical pencil may have a ball chuck or need not have a ball chuck. For example, the lead feedout member of the cap may also be applied to a pipe slide type mechanical pencil operating so that a pipe shaped lead guide comprised of a slider attached to the tip member also advances along with a projecting motion of the lead accompanying a click operation and the lead guide also retracts together with wear of the writing lead accompanying writing.

Figure 22:
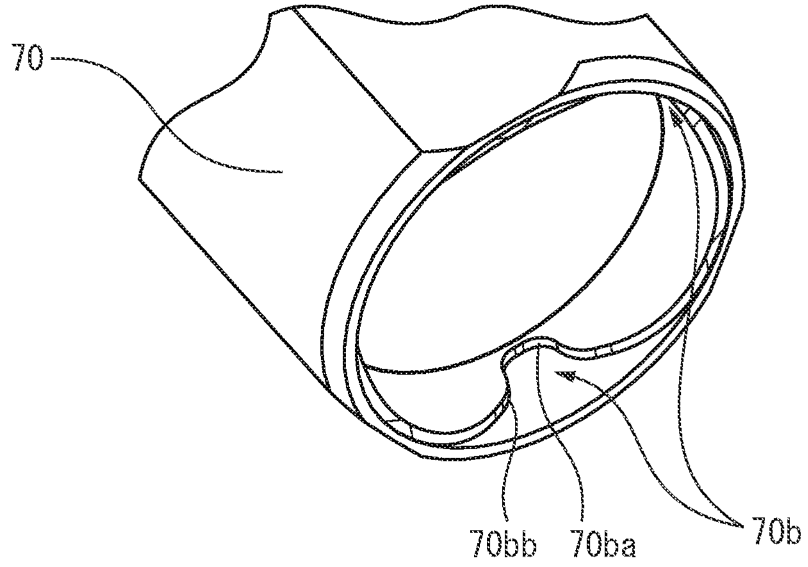
FIG. 22 is an enlarged perspective view of a cap.

FIG. 22 is an enlarged perspective view of the cap 70. At the inner circumferential surface of the cap 70, specifically, the inner circumferential surface of the vicinity of the open end, a plurality of, specifically three, positioning recesses 70*b*, arranged at equal intervals along the circumferential direction are provided. The positioning recesses 70*b* are recesses opening toward the back and are formed in bell shaped curved shapes when seen from the center axis to the outside in the diametrical direction. In other words, at the inside surfaces of the front sides of the positioning recesses 70*b*, projecting curved surfaces 70*ba* are formed, while at the inside surfaces of the back side of the positioning recesses 70*b*, recessed curved surfaces 70*bb* are formed.

Figure 23:
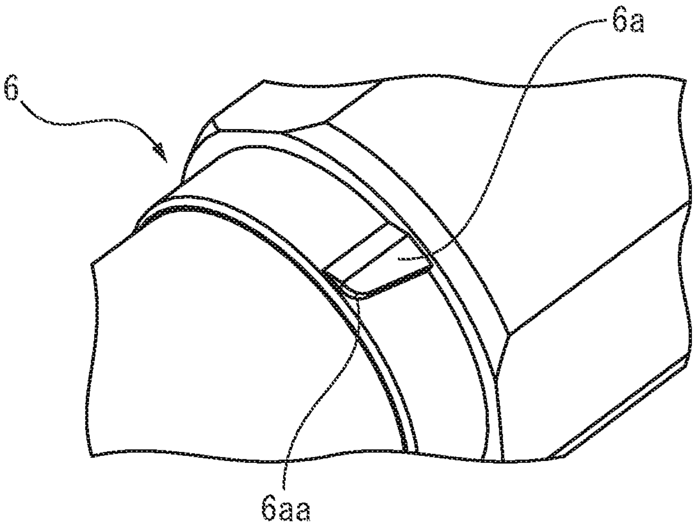
FIG. 23 is an enlarged perspective view of a cylindrical barrel.

FIG. 23 is an enlarged perspective view of the cylindrical barrel 6. As shown in FIG. 23 and further FIG. 2, the outer circumferential surface of the cylindrical barrel 6 is provided with a plurality of, specifically three, positioning projections 6*a* arranged at equal intervals along with circumferential direction. The positioning projections 6*a* are projecting parts extending toward the front. At parts of the outside surfaces at the front side of the positioning projections 6*a*, projecting curved surfaces 6*aa* are formed. The projecting curved surfaces 6*aa* of the positioning projections 6*a* are complementary with parts of the projecting curved surfaces 70*ba* of the positioning recesses 70*b*. In other words, the positioning projections 6*a* and positioning recesses 70*b* have mutually complementary parts.

As shown in FIG. 1 and (B) of FIG. 21, at the inside of the cap 70, a ring shaped magnet 80 is arranged. The magnet 80 is, for example, a neodymium magnet. Instead of the ring shaped magnet 80, a plurality of magnets may also be arranged at equal intervals along the circumferential direction. On the other hand, the above-mentioned holding part 8 is a first magnetic member manufactured from a magnetic material. The magnet 80 is arranged inside of the cap 70 so that attraction due to magnetic force acts with the holding part 8 when making the cap 70 fit with the cylindrical barrel 6.

When making the cap 70 fit with the cylindrical barrel 6, usually, one hand is used to grip the cylindrical barrel 6, the other hand is used to grip the cap 70, and the open end of the cap 70 is inserted into the cylindrical barrel 6. If inserting the cap 70 into the cylindrical barrel 6 down to a predetermined depth, the cap 70 is pulled in further deeper by the magnetic force acting between the holding part 8 and magnet 80. At this time, if the positioning projections 6*a* of the cylindrical barrel 6 and the positioning recesses 70*b* of the cap 70 are aligned along the axial direction, the positioning projections 6*a* and positioning recesses 70*b* fit together without interfering with each other and the cylindrical barrel 6 and cap 70 are fit together. On the other hand, sometimes the positioning projections 6*a* of the cylindrical barrel 6 and the positioning recesses 70*b* of the cap 70 are not aligned along the axial direction, i.e., are offset in the circumferential direction.

If the positioning projections 6*a* of the cylindrical barrel 6 and positioning recesses 70*b* of the cap 70 are just slightly offset in the circumferential direction, they are subjected to attraction by magnetic force and the projecting curved surfaces 6*aa* of the positioning projections 6*a* and the recessed curved surfaces 70*bb* of the positioning recess 70*b* abut. As a result, the cylindrical barrel 6 or cap 70 is made to rotate about the center axis and the cylindrical barrel 6 and cap 70 are fit together so that the positioning projections 6*a* and positioning recesses 70*b* cooperate and the positioning projections 6*a* and positioning recesses 70*b* fit together.

If the positioning projections 6*a* of the cylindrical barrel 6 and the positioning recesses 70*b* of the cap 70 are greatly offset in the circumferential direction, even if subjected to attraction by magnetic force, the projecting curved surfaces 6*aa* of the positioning projections 6*a* and the recessed curved surfaces 70*bb* of the positioning recesses 70*b* will not abut. Therefore, the positioning projections 6*a* and positioning recesses 70*b* will not cooperate and the cylindrical barrel 6 and cap 70 will not fit together. Here, one hand is used to grip the cap 70 and the cap 70 is made to rotate about the center axis until a position where the projecting curved faces 6*aa* of the positioning projections 6*a* and the recessed curved faces 70*bb* of the positioning recesses 70*b* abut against each other. As a result, the positioning projections 6*a* and positioning recesses 70*b* cooperate, the cylindrical barrel 6 or cap 70 are made to rotate about the center axis so that the positioning projections 6*a* and positioning recesses 70*b* fit together, and cylindrical barrel 6 and cap 70 are made to fit together.

The cylindrical barrel and cap are generally fit together in a snap manner by a projection formed at the inner circumferential surface of the cap riding over a projection formed at the outer circumferential surface of the cylindrical barrel. According to the above embodiments, the cylindrical barrel 6 and cap 70 are fit together utilizing the attraction due to magnetic force, so there is no need to strongly press the cap 70 against the cylindrical barrel 6. As a result, there is no liability of the rim of the open end of the cap 70 scratching the outer circumferential surface of the cylindrical barrel 6 if ending up inserting the cap 70 at a slant with respect to the center axis of the cylindrical barrel 6. Further, even if a weak strength child or senior citizen can easily fit together the cylindrical barrel 6 and cap 70.

Further, if symbols or words, patterns, or other identifying marks or designs or specialized shapes are applied to the outer surfaces of both the cylindrical barrel 6 and cap 70, it is possible to correctly position the cylindrical barrel 6 and cap 70 with respect to the rotational direction about the center axis. In short, according to the above-mentioned embodiments, it is possible to provide a writing utensil enabling a cap to be accurately fit together with respect to the cylindrical barrel. Further, there is the property that the closer the relative distance, the stronger the magnetic force becomes. At the time of completion of the fitting action, the cylindrical barrel 6 and cap 70 strongly strike each other. As a result, the user can experience a satisfying click feeling and click sound and can recognize that the parts are reliably fit together.

It should be noted that, as shown in FIG. 1, FIG. 2, and FIG. 4, at the rear end part of the cylindrical barrel 6, i.e., at the rear end part of the rear shaft 3, a second magnetic member 81 manufactured from a magnetic material may also be arranged. Due to this, even when the cap 70 fits together with the rear end part of the cylindrical barrel 6 due to writing, it is possible to utilize attraction by magnetic force. In this case, positioning projections 6*a* in cooperation with the positioning recesses 70*b* of the cap 70 may be provided at the rear end part of the cylindrical barrel 6. In the above-mentioned embodiments, positioning projections 6*a* were formed at the outer circumferential surface of the cylindrical barrel 6 and positioning recesses 70*b* were formed at the inner circumferential surface of the cap 70, but the positioning recesses may also be formed at the outer circumferential surface of the cylindrical barrel 6 and positioning projections may be formed at the inner circumferential surface of the cap 70. It should be noted that the mechanical pencil 1 need not have the second magnetic member 81.

In the above-mentioned embodiments, the magnet 80 was arranged at the cap 70 side and the non-magnet first magnetic member was arranged at the cylindrical barrel 6 side, but a first magnetic member may also be arranged at the cap 70 side and a magnet may be arranged at the cylindrical barrel 6 side, for example, inside the holding part 8. However, the holding part 8 is exposed to the outside in the state with the cap 70 detached, so from the viewpoint of magnetic members in the surroundings of the holding part 8, for example, paper clips on the desk etc., not being attracted, the first magnetic member is preferably arranged at the cylindrical barrel 6 side. Magnets may also be arranged at both of the cylindrical barrel 6 and cap 70. The first magnetic member may also be provided at a part of the cylindrical barrel 6 other than the holding part 8.

Three of each of the positioning projections 6*a* and positioning recesses 70*b* were formed in the above-mentioned embodiments, but one or two are also possible and four or more are also possible. The positioning projections 6*a* and positioning recesses 70*b* may be configured in any way, so long as they cooperate with each other when just slightly shifted in the circumferential direction and making the cylindrical barrel 6 or cap 70 rotate about the center axis so that the cylindrical barrel 6 and cap 70 fit together. For example, the positioning projections 6*a* shown in FIG. 23 may be formed to be completely complementary to the positioning recesses 70*b* shown in FIG. 22.

A fitting action utilizing attraction by the magnetic force between the cylindrical barrel and cap in the above-mentioned way may be applied not only to a mechanical pencil, but also another writing instrument, for example, a ballpoint pen, felt tip pen, marker pen, fountain pen, thermochromic writing instrument, or other writing instrument. The positioning projections 6*a* and positioning recesses 70*b* may be omitted and the writing utensil made one where the cylindrical barrel and cap are fit together utilizing just attraction by magnetic force.

Figure 24:
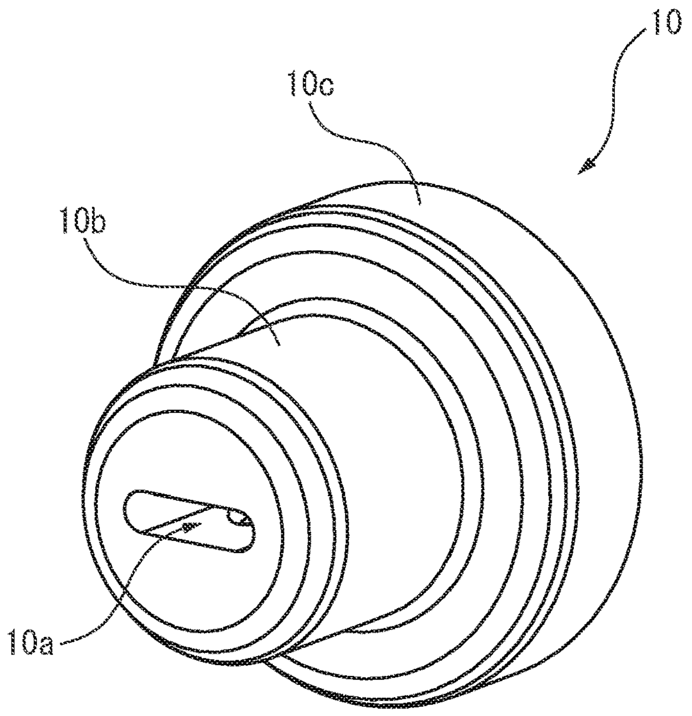
FIG. 24 is a perspective view of a holding chuck.
Figure 25:
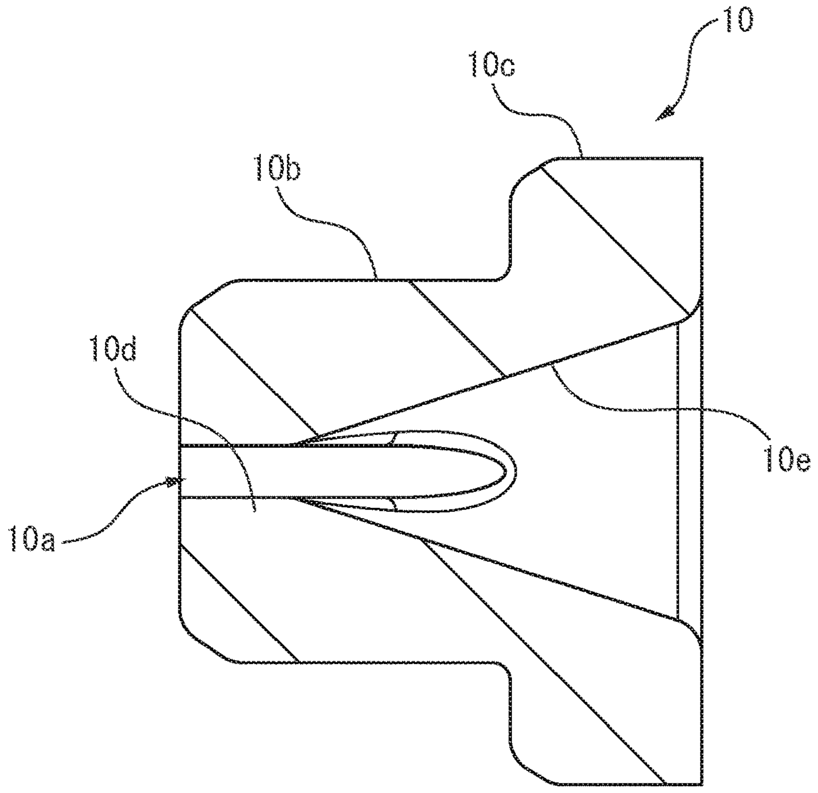
FIG. 25 is a vertical cross-sectional view of the holding chuck.

FIG. 24 is a perspective view of the holding chuck 10, while FIG. 25 is a vertical cross-sectional view of the holding chuck 10. In FIG. 25, the holding chuck is arranged so that the left becomes the front side of the mechanical pencil 1. As explained above, at the holding chuck 10, a through hole 10*a* is formed extending along the axial direction. The holding chuck 10 has a cylindrical shaped small diameter part 10*b* and a flange part 10*c* provided at an outer circumferential surface of a rear end part of the small diameter part 10*b*. At the inside of the front side of the through hole 10*a*, a lead holding part 10*d* more constricted than the other parts is provided. At the inside of the through hole 10*a* at the rear of the lead holding part 10*d*, a conical surface 10*e* expanding toward the rear is provided.

As shown in FIG. 24, the lead holding part 10*d* of the through hole 10*a* is a long hole. Specifically, the horizontal cross-sectional shape of the lead holding part 10*d* of the through hole 10*a* is a rounded rectangle. It should be noted that the lead holding part 10*d* of the through hole 10*a* need only be a long hole. Therefore, the horizontal cross-sectional shape of the lead holding part 10*d* may also be an oval. Specifically, it may also be an ellipse or oval. The size of the long hole, for example, the vertical and horizontal lengths or aspect ratio in a round rectangle or the lengths of the long axis and short axis in the case of an ellipse, is determined in advance by experiments etc. in accordance with the outside diameter of the lead 7 generally used in the mechanical pencil 1 or the composition of the lead 7.

Due to the lead holding part 10*d* of the through hole 10*a* being a long hole, elastic deformation becomes easier compared with a lead holding part with a general circular hole. I.e., a long hole has a hard time elastically deforming in a direction along the direction of extension of the elongated shape in the same way as a circular hole. On the other hand, it more easily elastically deforms in a direction perpendicular to the direction of extension of the elongated shape compared with a circular hole. Therefore, even if there is some variation in the outside diameter of the lead 7 or size of the through hole of the holding chuck 10 at the time of manufacture, it is possible to absorb it by the elastic deformation in the direction of extension of the elongated shape. Therefore, it is possible to provide a mechanical pencil enabling the sliding friction between the lead 7 and holding chuck 10 to be more suitably set.

In a general mechanical pencil, the lead and the holding chuck slide against each other only at the time of feedout of lead by a click operation. On the other hand, as explained above, in the mechanical pencil 1 provided with the rotation drive mechanism and lead feedout mechanism, the lead 7 and holding chuck 10 slide against each other not only at the time of feedout of lead 7 by a click operation, but also at the time of usual writing. Therefore, to make the rotation drive mechanism and lead feedout mechanism suitably function, the sliding friction between the lead and holding chuck is preferably more strictly set. In the mechanical pencil 1, by the lead holding part 10*d* of the through hole 10*a* being a long hole, it is possible to more strictly set the sliding friction between the lead 7 and holding chuck 10.

The holding chuck 10 is, for example, produced from NBR, EPDM, fluororubber, silicone rubber, or another elastic material. In particular, a fluororubber holding chuck 10 is preferable from the viewpoint of creep resistance and chemical resistance. In other words, lead 7 contains an oil component to some extent, but by manufacturing the holding chuck 10 by a fluororubber, it is possible to reduce the effects due to the oil component more. As a result, it is possible to select various types of oil components and their formulations as the lead 7 and becomes possible to produce more varied lead. In this case, the lead holding part 10*d* may be not only a long hole, but also a general circular shaped horizontal cross-sectional shape.

In the above-mentioned embodiments, the holding chuck 10 had a cylindrically shaped small diameter part 10*b*, but it is possible to form a holding chuck in a tapered shape overall. In summary, the holding chuck 10 may be freely configured in any way so long as the lead holding part 10*d* of the through hole 10*a* is a long hole.

REFERENCE SIGNS LIST

1 mechanical pencil
2 front shaft
3 rear shaft
4 tip member
6 cylindrical barrel
6*a* positioning projection
7 lead
8 holding part (first magnetic member)
9 slider
10 holding chuck
10*a* through hole
10*d* lead holding part
11 ball chuck
12 relay member
17 coil spring
18 cam abutting spring
19 lead case
20 click rod
21 coil spring
30 rotation drive mechanism
40 rotaly part
50 dial cam member
51 dial cam
52 rail cam member
53 rail cam
54 feedout face
55 step part
56 coil spring
60 clutch mechanism
61 input clutch cam
62 output clutch cam
63 clutch cam face
64 transmission cam
65 feedout cam
65*c* abutting part
66 clutch cam holder
70 cap
70*b* positioning recess
71 cover cap
72 lead feedout member
72*a* insertion hole
72*b* receiving recess
73 cushion spring
80 magnet
81 second magnetic member

The invention claimed is:

1. A mechanical pencil comprising
a ball chuck allowing advance of lead and preventing retraction,
a rotation drive mechanism having a rotary part and receiving a retracting motion in the axial direction due to writing pressure received by the lead gripped by the ball chuck and an advancing motion in the axial direction due to release of writing pressure so as to make the rotary part be driven to rotate in one direction,
a feedout face having a ring-shaped cam face and a drop difference in the axial direction provided at the ring-shaped cam face,
an input member rotating upon receiving a rotational drive force of the rotary part, and
an output member having an abutting part abutting against the feedout face and a slider provided with a holding chuck holding lead,
configured so that the abutting part moves along the feedout face corresponding to rotation of the output member and so that advancing motion of the slider when the abutting part drops into the drop difference causes lead held by the holding chuck to be pulled out by the ball chuck, and
further comprising a clutch mechanism transmitting rotational movement of the input member to the output member so that when the input member rotates by exactly a first rotational angle, the output member rotates by exactly a second rotational angle smaller than the first rotational angle.

2. The mechanical pencil according to claim 1, wherein the clutch mechanism is a claw clutch or friction clutch.

3. The mechanical pencil according to claim 1, wherein the clutch mechanism is a claw clutch, the input member is formed with an input cam face and the output member is formed with an output cam face facing the input cam face, the input cam face and output cam face engage at only part of rotational movement of the rotary part, and rotational movement of the rotary part is transmitted through the input member to the output member.

4. The mechanical pencil according to claim 3, wherein the rotation drive mechanism has a first cam-forming member and second cam-forming member, the rotary part is formed in a circular ring shape, one end face and the other end face in the axial direction are respectively formed with a first cam face and a second cam face, and the first cam face and the second cam face have a first fixed cam face and a second fixed cam face formed at the first cam-forming member and the second cam-forming member respectively facing them arranged at them, the mechanical pencil configured so that retracting motion of the ball chuck due to the writing pressure causes the first cam face of the rotary part to abut against and mesh with the first fixed cam face and so that release of the writing pressure causes the second cam face of the rotary part to abut against and mesh with the second fixed cam face, in the state where the first cam face of the rotary part has meshed with the first fixed cam face, the second cam face and the second fixed cam face of the rotary part are set to a relationship shifted in phase with respect to one tooth of the cam in the axial direction and, in the state where the second cam face of the rotary part has meshed with the second fixed cam face, the first cam face of the rotary part and the first fixed cam face are set to a relationship shifted in phase with respect to one tooth of the cam in the axial direction, and a pitch of cam in the clutch mechanism is set smaller than a pitch of cam in the rotation drive mechanism.

5. The mechanical pencil according to claim 1, configured so that the lead rotates by the ball chuck rotating by receiving rotational drive force of the rotary part.

6. The mechanical pencil according to claim 1, wherein between the output member and the cylindrical barrel, a viscous fluid inhibiting movement of the output member in the axial direction is arranged.

7. The mechanical pencil according to claim 1, configured so that the height of the drop difference is adjusted so that that amount of feedout of lead is adjusted.

8. The mechanical pencil according to claim 7, further comprising a ring shaped or cylindrical shaped first cam member and a ring shaped or cylindrical shaped second cam member arranged outside the first can member in the diametrical direction, the feedout face configured by the first can member and the second cam member cooperating.

9. The mechanical pencil according to claim 8, whereby a height of the drop difference is adjusted by making the first can member and the second cam merber rotate relatively about a center axis.

* * * * *